US012745690B2

(12) United States Patent
Pell et al.

(10) Patent No.: US 12,745,690 B2
(45) Date of Patent: Sep. 29, 2026

(54) VIRTUAL SAFETY BUBBLES FOR SAFE NAVIGATION OF FARMING MACHINES

(71) Applicant: Deere & Company, Moline, IL (US)

(72) Inventors: Edward William Jeffcott Pell, Sunnyvale, CA (US); Ugur Oezdemir, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 356 days.

(21) Appl. No.: 18/087,060

(22) Filed: Dec. 22, 2022

(65) Prior Publication Data

US 2023/0210039 A1 Jul. 6, 2023

Related U.S. Application Data

(60) Provisional application No. 63/296,145, filed on Jan. 3, 2022, provisional application No. 63/296,144, filed on Jan. 3, 2022.

(51) Int. Cl.

| | |
|---|---|
| ***A01B 79/00*** | (2006.01) |
| ***G05D 1/00*** | (2024.01) |
| ***G06V 20/50*** | (2022.01) |

(52) U.S. Cl.

CPC ......... *A01B 79/005* (2013.01); *G05D 1/0214* (2013.01); *G05D 1/0231* (2013.01); *G06V 20/50* (2022.01)

(58) Field of Classification Search

CPC ..... A01B 69/001; A01B 79/005; A01B 67/00; A01B 69/007; G05D 1/0214; G05D 1/0231; G05D 1/0246; G06V 20/50

See application file for complete search history.

(56) References Cited

U.S. PATENT DOCUMENTS

2018/0210444 A1* 7/2018 Sakaguchi ............ G01S 15/931
2019/0161274 A1* 5/2019 Paschall, II .......... G05D 1/0246

(Continued)

FOREIGN PATENT DOCUMENTS

| | | | | |
|---|---|---|---|---|
| EP | 3352040 | A1 | | 7/2018 |
| JP | 2007230314 | A | * | 9/2007 |
| WO | WO 2020/106143 | A1 | | 5/2020 |

OTHER PUBLICATIONS

European Patent Office, Extended European Search Report and Written Opinion, European Patent Application No. 22216465.9, May 10, 2023, 8 pages.

(Continued)

*Primary Examiner* — Angela Y Ortiz
*Assistant Examiner* — Aarron E Santos
(74) *Attorney, Agent, or Firm* — Fenwick and West LLP

(57) ABSTRACT

An autonomous farming machine navigable in an environment for performing farming action(s) is disclosed. The farming machine receives a notification from a manager that there are no obstacles in the blind spots of the detection system. The farming machine applies an obstacle detection model to the captured images to verify that there are no obstacles in unobstructed views. The farming machine determines a configuration of the farming machine. The farming machine determines a virtual safety bubble for the farming machine to autonomously perform the farming action(s) based on the determined configuration. The farming machine detects an obstacle in the environment by applying the obstacle detection model to the captured images. The farming machine determines that the obstacle is entering the virtual safety bubble. In response to determining that the obstacle is entering the virtual safety bubble, the farming machine terminates operation of the farming machine and/or enacts preventive measures.

19 Claims, 28 Drawing Sheets

(56) References Cited

U.S. PATENT DOCUMENTS

| | | | | |
|---|---|---|---|---|
| 2019/0387670 | A1 | 12/2019 | Matsuda et al. | |
| 2020/0134330 | A1* | 4/2020 | Cherney ............. | G06F 18/2431 |
| 2021/0153418 | A1* | 5/2021 | Lupu ...................... | A01B 71/02 |

OTHER PUBLICATIONS

Zhang, X. et al. "Method for an Electronic Controlled Platooning System of Agricultural Vehicles," *IEEE International Conference on Vehicular Electronics and Safety*, Nov. 11-12, 2009, pp. 161-166.

European Patent Office, Extended European Search Report, European Patent Application No. 24208971.2, Feb. 5, 2025, nine pages.

Zhang, X. et al. "Method for an Electronic Controlled Platooning System of Agricultural Vehicles," IEEE International Conference on Vehicular Electronics and Safety, Nov. 11-12, 2009, pp. 156-161.

Australian Search Report issued in application No. 2024259821 dated Nov. 17, 2025, 04 pages.

* cited by examiner

VIRTUAL SAFETY BUBBLES FOR SAFE NAVIGATION OF FARMING MACHINES

CROSS REFERENCE TO RELATED APPLICATIONS

This application claims the benefit of and priority to U.S. Provisional Application No. 63/296,145 filed on Jan. 3, 2022, and U.S. Provisional Application No. 63/296,144 filed on Jan. 3, 2022, both of which are incorporated by reference in their entirety.

TECHNICAL FIELD

This disclosure generally relates to farming machines with autonomous navigation capabilities. The farming machines are generally utilized in farm environments to perform farming actions.

BACKGROUND

Farming machines generally outsize human operators and various other objects in their environment. With such bulk in size, such farming machines generally have difficulty gauging the proximity of objects to the farming machines. As such, operators must move slowly and with great care, especially in confined or dense environments. The challenge in navigating such environments is further compounded in the case with automated farming machines.

SUMMARY

A farming machine is configured to generate and maintain a virtual safety bubble that enables the farming machine to autonomously perform farming actions in the environment safely. The farming machine is a navigable vehicle with at least a detection system and a control system, among other components for performing the farming actions. The detection system includes one or more detection mechanisms, e.g., cameras, for capturing image data of the surrounding environment. The detection system may have a 360-degree field of view, aggregated from the individual fields of view of the detection mechanisms. The control system, e.g., a general computing system, controls operation of the various components. To aid in the safe navigation of the farming machine, the control system may generate and maintain a virtual safety bubble based on a configuration of the farming machine. The control system may dynamically and automatically adjust the virtual safety bubble as the farming machine switches between different configurations and/or performs different farming actions. The control system detects when an obstacle breaches the virtual safety bubble. When an object is determined to have breached, i.e., is within the virtual safety bubble, the control system may terminate or cease operations, and/or may enact other preventive measures. Preventive measures include rerouting the farming machine around the obstacle, changing a configuration of the farming machine, requesting input from an operator or a manager, etc.

DETAILED DESCRIPTION

I. Introduction

Figure 1A:
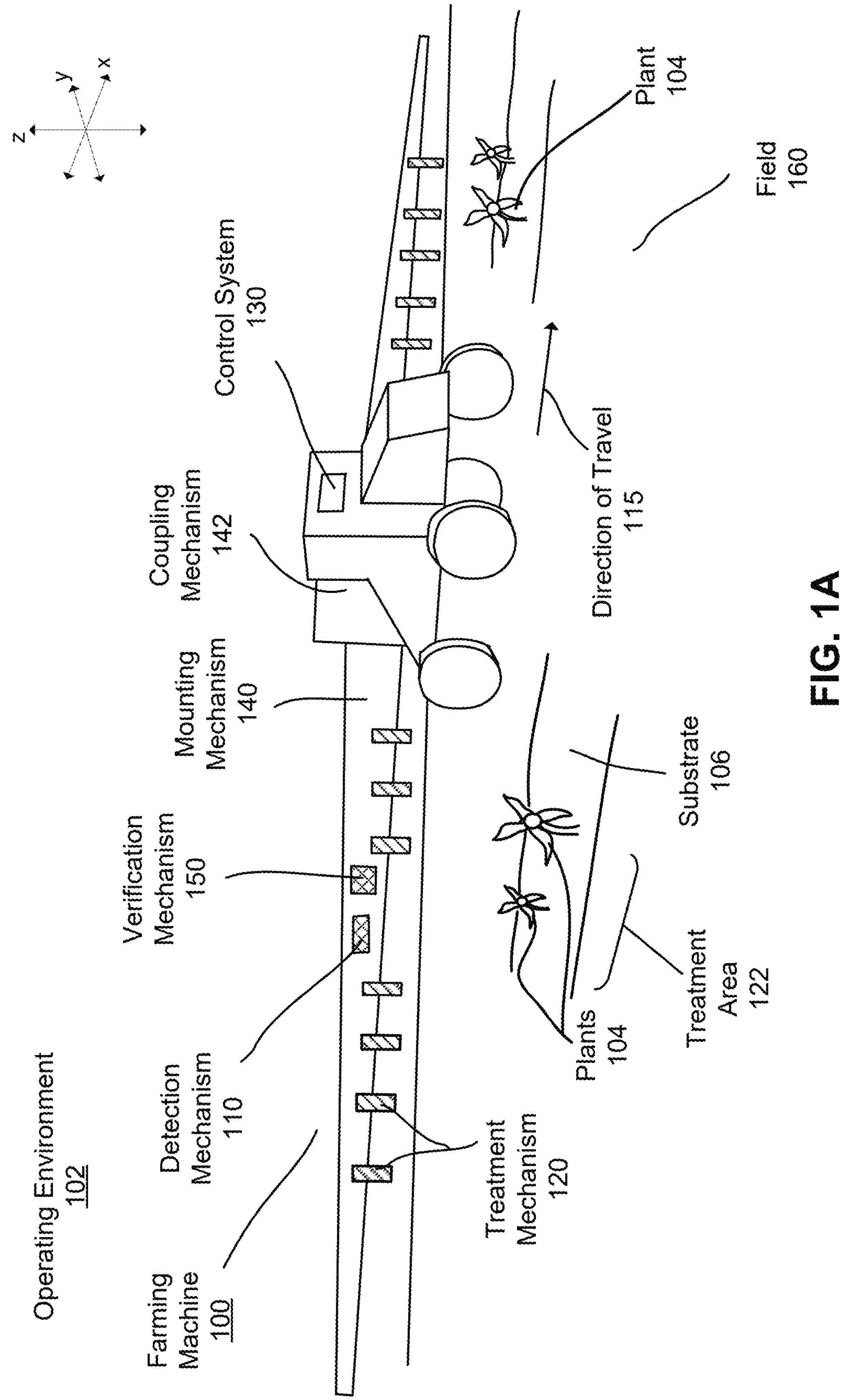
FIG. 1A illustrates an isometric view of a farming machine, in accordance with one or more embodiments.

A farming machine is configured to generate and maintain a virtual safety bubble that enables the farming machine to autonomously perform farming actions in the environment safely. The farming machine is, generally, a navigable vehicle comprising a detection system, a treatment mechanism, a verification mechanism, among other components. The detection system includes one or more detection mechanisms, e.g., cameras, for capturing image data of the surrounding environment. The detection system may have a 360-degree field of view, aggregated from the individual fields of view of the detection mechanisms. The farming machine's treatment mechanism applies treatment as part of the performable farming action(s) and the verification mechanism verifies that the treatment was successful. The farming machine may further comprise a control system, e.g., a general computing system, for controlling operation of the various components.

To aid in the safe navigation of the farming machine, the control system may generate and maintain a virtual safety bubble that triggers when an obstacle breaches the virtual safety bubble. When an object is determined to have breached, i.e., is within the virtual safety bubble, the control system may terminate or cease operations, and/or may enact other preventive measures. Preventive measures include rerouting the farming machine around the obstacle, changing a configuration of the farming machine, requesting input from an operator or a manager, etc.

The control system generates the virtual safety bubble based on a configuration of the farming machine. As the farming machine changes configuration, the control system can automatically and/or dynamically adjust the virtual safety bubble, by adjusting characteristics of the virtual safety bubble. For example, when the farming machine accelerates to a higher velocity, the control system can automatically and/or dynamically adjust a size of the virtual safety bubble to be larger than before to provide additional distance to enact the preventive measures. In another example, the farming machine may change its configuration to perform different farming actions, and the control system can automatically and/or dynamically adjust the parameters of the virtual safety bubble in response to the changed configuration.

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Farming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the farming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
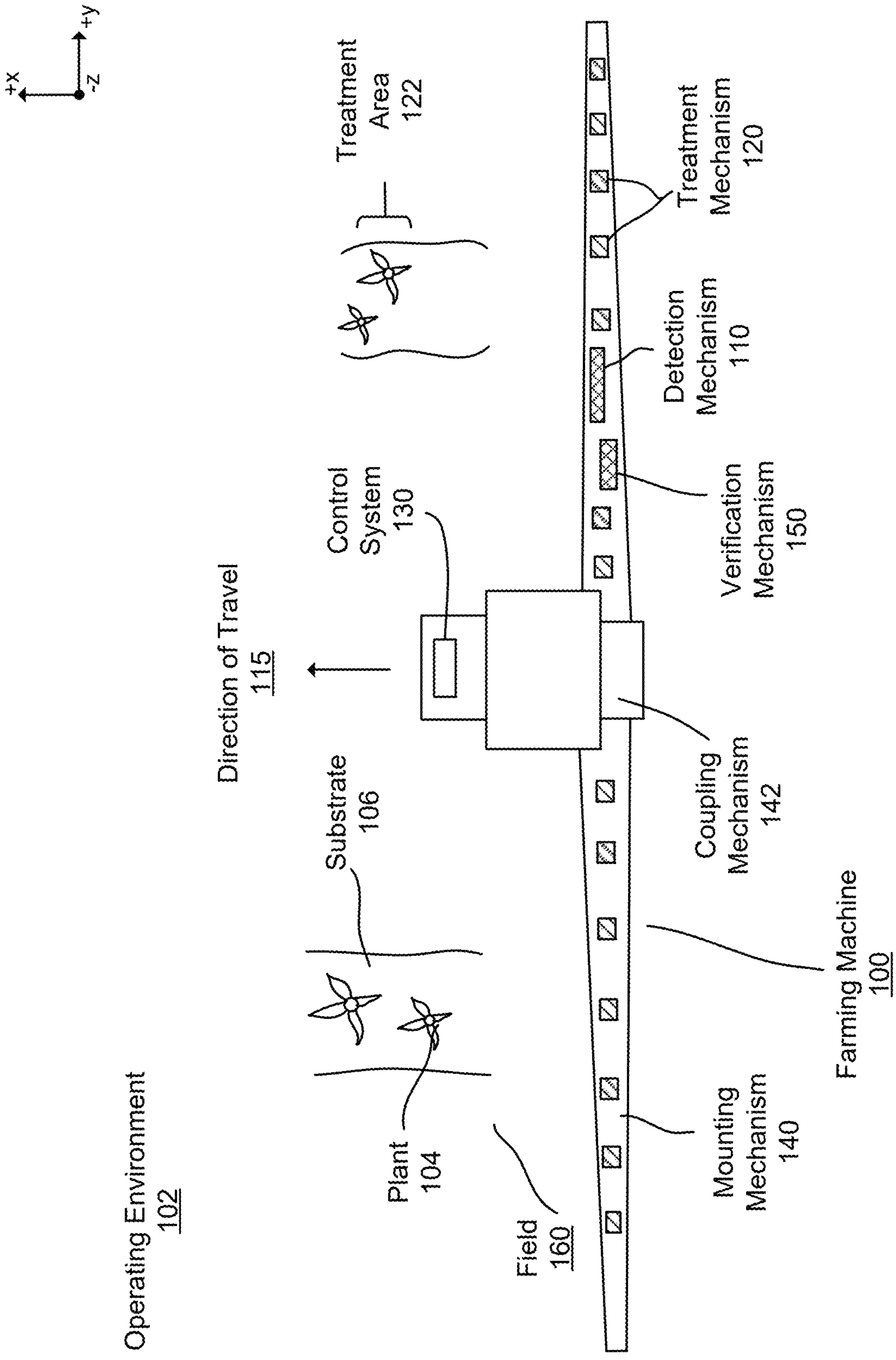
FIG. 1B illustrates a top view of the farming machine in FIG. 1B, in accordance with one or more embodiments.
Figure 1C:
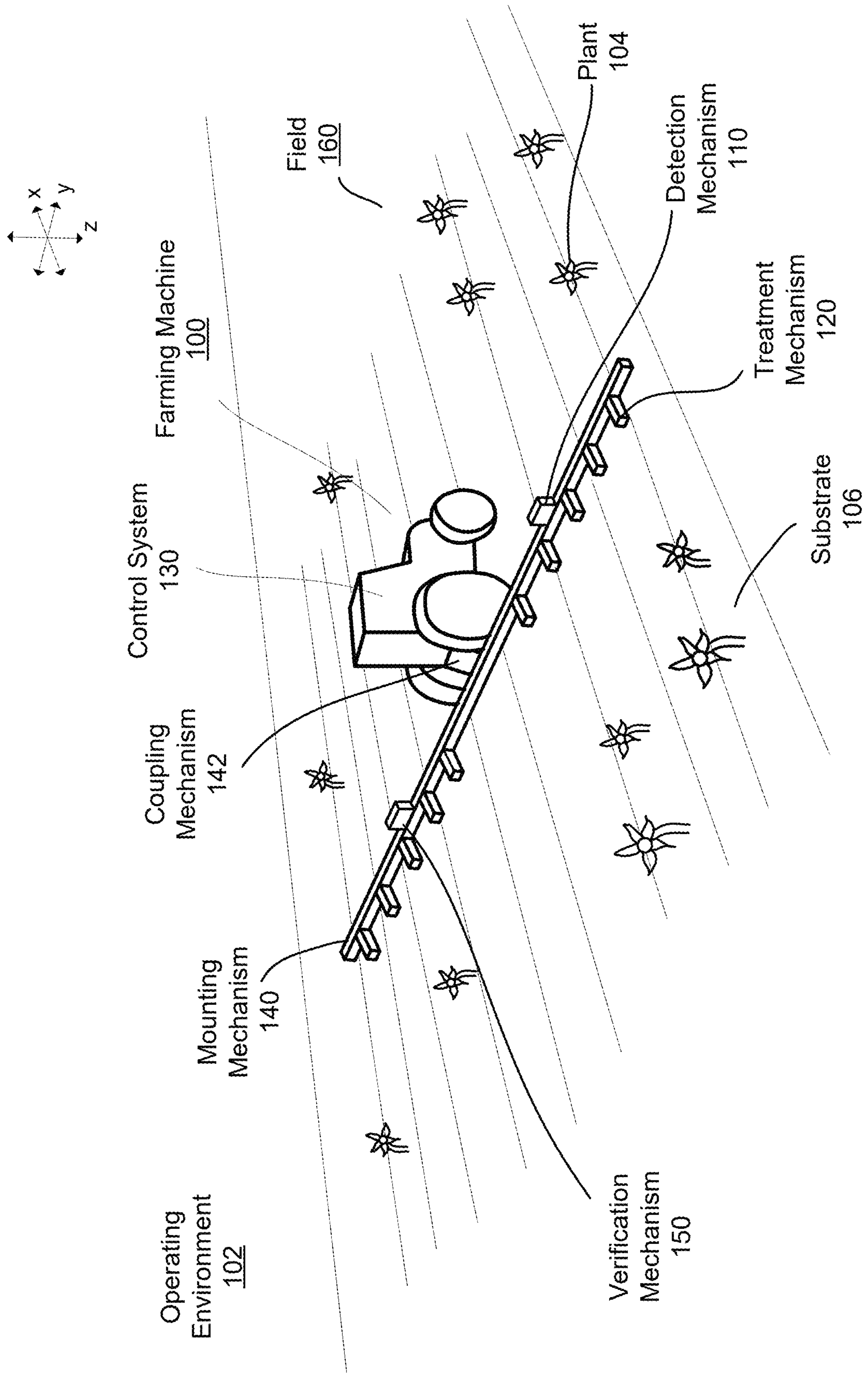
FIG. 1C illustrates an isometric view of a second farming machine, in accordance with one or more embodiments.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one or more embodiments.

The farming machine 100 generally includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment

The farming machine 100 operates in an operating environment 102. The operating environment 102 is the environment surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment (e.g., sensor or image data), and processes that information to identify pertinent objects (e.g., plants 104, substrate 106, persons, etc.) in the operating environment 102. Identifying objects in the environment further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment surrounding the farming machine 100. For example, the detection mechanism 110 may include an array of cameras configured to capture an array of pictures representing the environment surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100. The detection mechanism 110 may be removably coupled to the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

The configuration of the treatment mechanism 120 may affect parameters of the virtual safety bubble. For example, the treatment mechanism 120 may be collapsed in a compact configuration or deployed in an expanded configuration, and the control system generating the virtual safety bubble may automatically and/or dynamically adjust parameters of the safety bubble based on whether the treatment mechanism 120 is in the collapsed configuration or the expanded configuration. In another example, the treatment mechanism 120 may be operable for multiple farming actions. Based on the farming action, the control system may automatically and/or dynamically adjust parameters of the safety bubble.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100. The control system 130 may further aid in the navigation of the farming machine around the operating environment 102. Navigation may include collecting and analyzing data relating to the environment from one or more sensors and generating navigation instructions based on the data.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B System Environment

Figure 2:
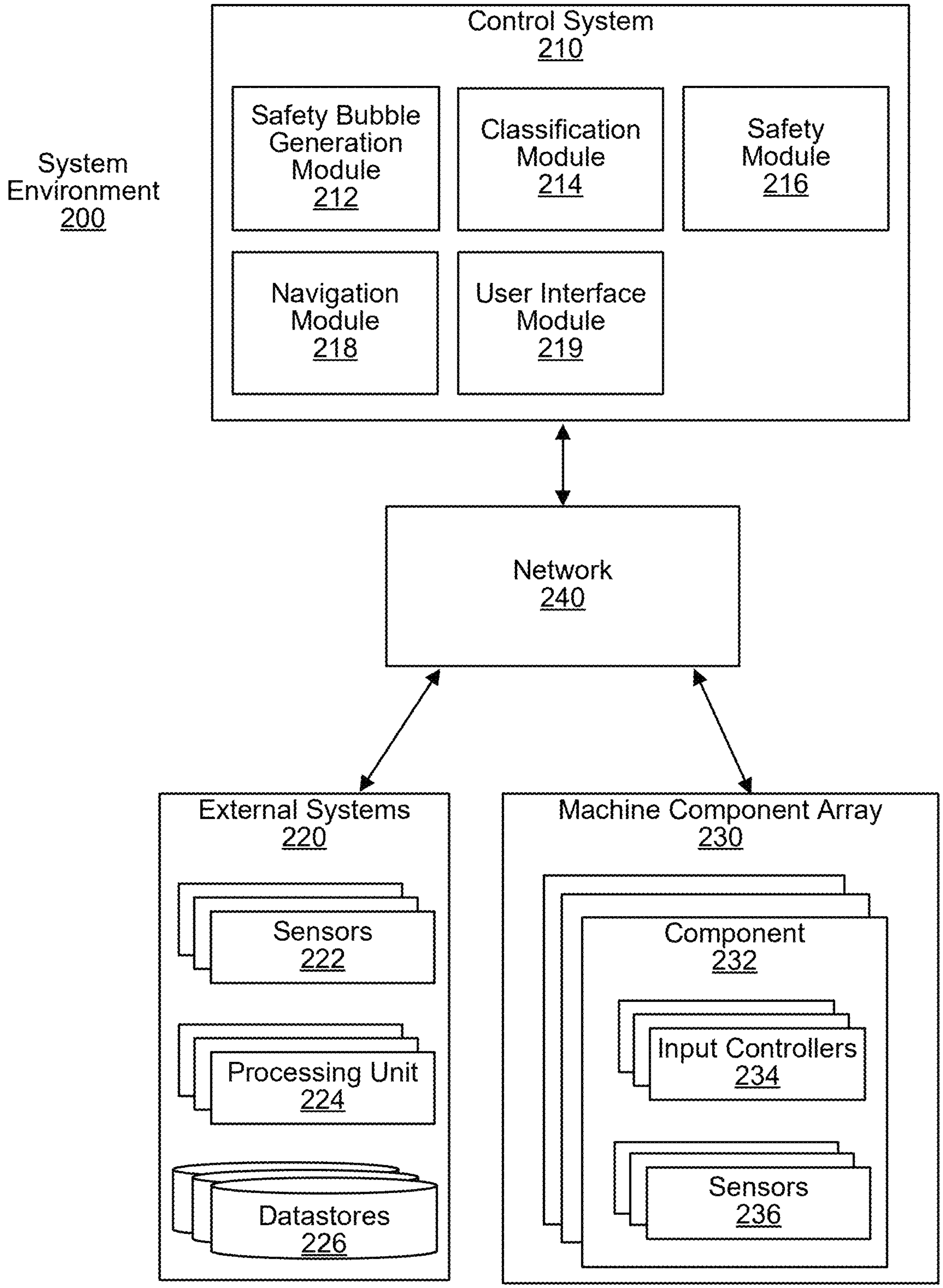
FIG. 2 illustrates a block diagram of the system environment for the farming machine, in accordance with one or more embodiments.

FIG. 2 is a block diagram of the system environment 200 for the farming machine 100, in accordance with one or more embodiments. In this example, the control system 210 (e.g., control system 130) is connected to external systems 220 and a machine component array 230 via a network 240 within the system environment 200.

The external systems 220 are any system that can generate data representing information useful for determining and implementing farming actions in a field. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in determining and implementing farming actions in the field. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in determining and implementing farming actions in the field. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific farming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 210 receives information from external systems 220 and the machine component array 230 and implements a treatment plan in a field using a farming machine 100. Before implementing the treatment plan, the farming machine verifies that it is safe to operate. To do so, the control system 210 receives a notification from a manager that the environment surrounding the farming machine is safe for operation and empty of obstacles. The control system 210 verifies, using captured images, that there are no obstacles in the environment surrounding the farming machine. The control system 210 generates a virtual safety bubble for the farming actions based on a configuration of the farming machine. While the farming machine is implementing the farming actions, the control system 210 continually identifies and locate obstacles in the environment. If one of the obstacles is within the virtual safety bubble, the control system 210 may stop operation or enact preventive measures.

The control system 210 includes a safety bubble generation module 212, a classification module 214, a safety module 216, a navigation module 218, and a user interface module 219. In other embodiments, the control system 210 has additional/fewer modules. In other embodiments, the modules may be variably configured such that functions of one may be performable by one or more other modules.

The safety bubble generation module 212 generates a virtual safety bubble for the farming machine 100. The virtual safety bubble may be a three-dimensional shape around the farming machine 100. In other embodiments, the virtual safety bubble may have a belt shape, e.g., a wall of certain height that surrounds the farming machine 100. Various other shapes and sizes may be envisioned. The safety bubble generation module 212 sets the shape and size of the virtual safety bubble based on the configuration of the farming machine 100. For example, the safety bubble generation module 212 may determine a shape and/or a size of the virtual safety bubble based on whether the farming machine 100 is in a first configuration for navigating to an operating environment or in a second configuration for performing a treatment plan. The safety bubble generation module 212 may dynamically adjust the virtual safety bubble based on sensor data. For example, the safety bubble generation module 212 may increase the virtual safety bubble size in response to a sunset darkening the operating environment.

The classification module 214 classifies objects in the images captured by the cameras (embodiment of sensors 222) implemented on the farming machine 100. The classification module 214 may utilize one or more models to classify pixels relating to objects the image. One model may identify obstacles as objects not part of the farming operation. For example, the model may classify rows of crop as non-obstacles but would classify a wild fox or a large boulder as an obstacle. Another model may perform image segmentation, classifying pixels for various object types, e.g., the ground, the sky, foliage, obstacles, etc. Yet another model may calculate a velocity of objects relative to the farming machine 100, e.g., using one or more visual odometry methods. And still another model may predict depth of the objects from the camera, e.g., utilizing a depth estimation model trained to predict the depth based on image data. Depth generally refers to the distance between the farming machine and pixels or objects in the images. For example, a first object present in an image can be determined to be at a depth of 5 meters from the farming machine. The classification module 214 may further generate 3D point cloud representations of objects within a virtual operating environment, allowing for tracking of objects. The various models may input other sensor data (captured by the sensors 222 or the sensors 236) to aid in the classification, e.g., LIDAR data, temperature measurements, etc.

The safety module 216 evaluates whether obstacles are within the virtual safety bubble. The safety module 216 may utilize a depth estimation model to predict depths of obstacles relative to the farming machine 100. If an obstacle has a depth that is below the virtual safety below, i.e., some portion of the obstacle breaks the barrier of virtual safety bubble, then the safety module 216 provides that notice to the navigation module 218, e.g., for ceasing operation or enacting preventive measures.

The navigation module 218 navigates the farming machine 100. The navigation module 218 generates navigation instructions based on a treatment plan. The treatment plan may include one or more farming operations to be completed. The navigation module 218 may chart a route to navigate the vehicle. The navigation module 218 may adjust the navigation route based on sensor data. The navigation module 218 may receive notices from the safety module 216 that an obstacle has breached the virtual safety bubble. In response to the notice, the navigation module 218 may cease operations, enact other preventive measures, or some combination thereof. In one example of a prevent measure, the navigation module 218 can bring the farming machine 100 to a stop when notice is given that an obstacle has breached the virtual safety bubble. As another example of a prevent measure, the navigation module 218 can chart a route around the obstacle to prevent collision. Additional details relating to navigation by the navigation module 218 is described in FIGS. 11-18

The user interface module 219 maintains a graphical user interface (GUI) for displaying information to the manager of the farming machine 100 and receiving inputs from the manager. The user interface module 219 may graphically illustrate the farming machine 100 in operation, e.g., when moving along a path, or when performing one or more farming actions. The GUI may also display any obstacles or other objects in the operating environment. The GUI may further be configured to receive inputs to control the farming machine 100. Example inputs include toggling a speed to the farming machine 100, manual adjustment of the virtual safety bubble, etc. In one embodiment, the GUI may notify a manager of the farming machine 100 that an obstacle has breached the virtual safety bubble, the GUI may request action or input from the manage in how to respond. Example user interfaces are further described in FIGS. 6-10.

In one or more embodiments, the models used by the control system 110 may be trained as machine-learning models using training data. The training may be supervised, unsupervised, or semi-supervised. Various types of machine-learning model architectures may be implemented, e.g., neural networks, decision trees, support vector machine learning, etc.

The network 240 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

IV. Obstructed Views and Unobstructed Views

As described above, a farming machine is configured with one or more detection mechanisms ("detection system") to measure the environment. In one configuration the detection system may be an array of detection mechanisms configured to capture images of the environment. Image data in the image represent the various objects in the environment surrounding the farming machine. Thus, the detection system is configured to capture image data of the environment.

The detection system has a field of view, and because the detection system is an array of detection mechanisms, the detection system's field of view may comprise of several fields of view that may be composited together to form a 360-degree view. That is, each detection mechanism has its own field of view, and the fields of view, in aggregate, form the field of view of the detection system.

There may be one or more blind spots in a field of view caused by the configuration of the detection system. Some blind spots can include areas outside of reach of any detection mechanism and obstructed views, e.g., views within the field of view of the detection system but obstructed by one or more objects. Obstructed views comprise image data in images where an object obstructs an object or objects behind it (such that obstructed objects are obscured from view). Unobstructed views comprise image data in images where no objects obstruct an object or objects behind it. For example, consider a detection mechanism capturing images of a tire coupled to the farming machine and the surrounding environment. Because the tire is obscuring image data of objects behind the tire (e.g., ground, rocks, etc.) it is an obstructed view. The remainder of the image is an unobstructed view because there are no objects obscuring other objects.

Obstructed views are problematic in autonomous farming due to their inherent safety issues. For example, an object that may be a significant obstacle may be obscured by another object in an obstructed view. The farming machine may therefore be unable to identify and account for a problematic obstacle. Methods are presented herein to establish a virtual safety bubble to prevent obstacles from entering obstructed views of the farming machine.

Figure 3A:
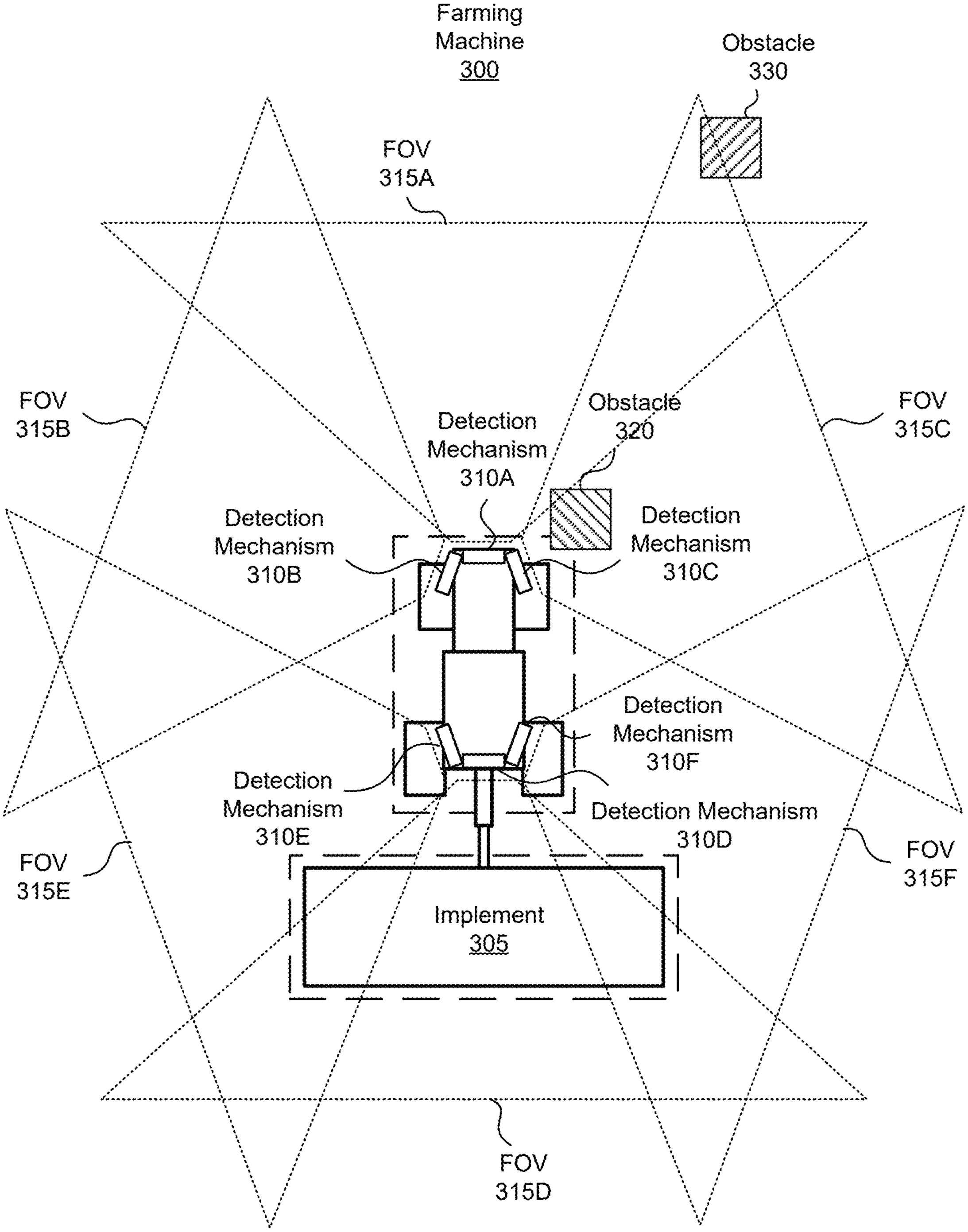
FIG. 3A illustrates a farming machine with one or more inherent blind spots based on the positioning of a plurality of detection mechanisms, in accordance with one or more embodiments.

FIG. 3A illustrates a farming machine 300 (an embodiment of the farming machine 100) pulling an implement 305 and outfitted with a detection system. The farming machine 300 has a detection system with a total of six detection mechanisms 310. Three detection mechanisms 310A, 310B, and 310C are positioned on a front end of the farming machine 300, with the remaining three detection mechanisms 310D, 310E, 310F positioned on a back end of the farming machine 300 towards the implement 305. As noted above the detection system's field of view may aggregate the individual fields of view 315 from the detection mechanisms. Detection mechanism 310A has field of view 315A. Detection mechanism 310B has field of view 315B. Detection mechanism 310C has field of view 315C. Detection mechanism 310D has field of view 315D. Detection mechanism 310E has field of view 315E. Detection mechanism 310F has field of view 315F.

FIG. 3A also illustrates two obstacles. The first obstacle 320 is just off the front-right tire of the farming machine. The second obstacle 330 is to the front right of the farming machine. The farming machine 300 is configured to apply an obstacle detection model to images captured by the detection mechanism to identify the obstacles in the environment. That is, the farming machine 300 employs the obstacle detection model to determine that pixels in images represent obstacles and locates the approximate location of those obstacles in the environment (e.g., by estimating depth).

As described above, the detection system of the farming machine 300 includes various blind spots. Blind spots are areas in the environment not visible by the farming machine because, for instance, a portion of the farming machine obstructs the view (e.g., behind a tire), or the detection mechanisms are nor positioned to capture that portion of the environment (e.g., under the tractor).

Figure 3B:
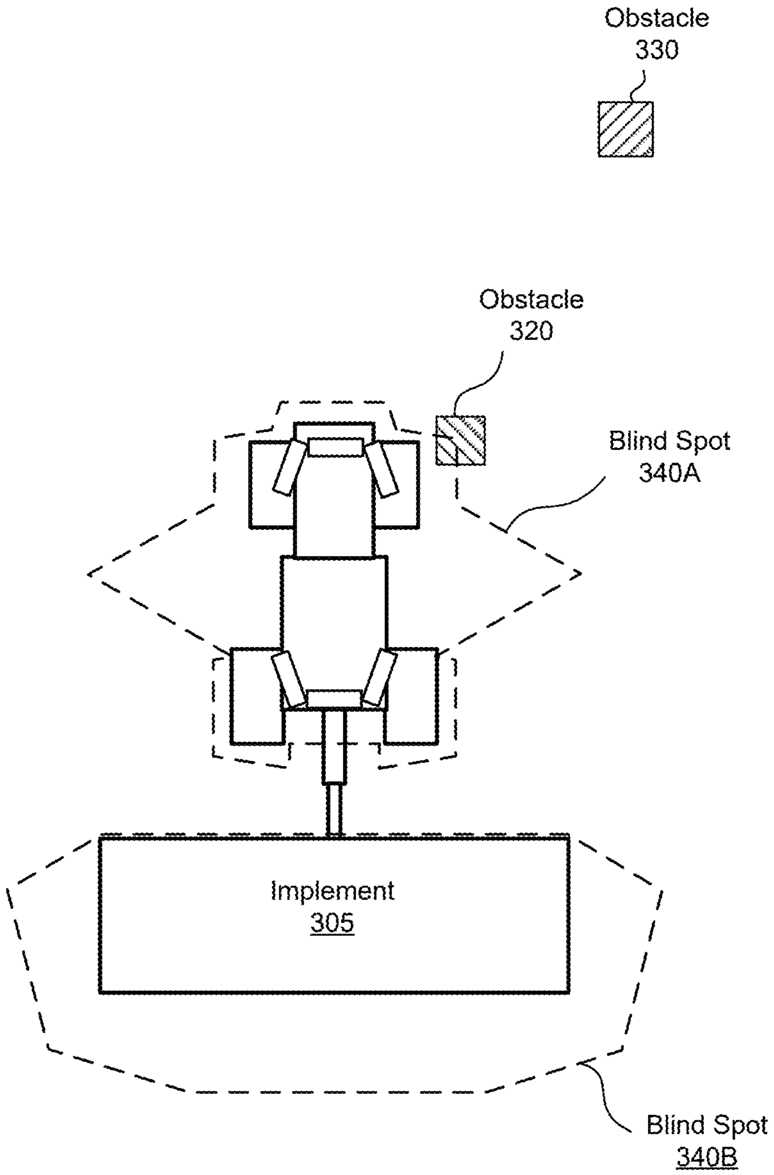
FIG. 3B illustrates a farming machine with one or more blind spots caused by components of the farming machine obstructing a partial view of the detection mechanism, in accordance with one or more embodiments.

FIG. 3B illustrates one or more blind spots of the farming machine in FIG. 3A. The blind spots are indicated by polygons. The first blind spot 340A may be a combination of the footprint of the farming machine 300 (including vehicle frame, tires, other components obstructing views) and gaps between detection mechanisms (e.g., a gap on the left between detection mechanisms 310B and 310E and another gap on the right between detection mechanisms 310C and 310F). The second blind spot 340B may be an obstructed view caused by the farming implement 305 having some height blocking views.

FIG. 3B also illustrates the two obstacles. Here, the first obstacle 320 is partially in the blind spot 340A and the second obstacle 330 is in unobstructed view and within the field of view of the detection system. As such, when applying the obstacle detection model to images captured by the detection system, farming machine would not be able to identify and locate the first obstacle 320 but would be able to identify and locate the second obstacle 330.

V. Verifying No Obstacles

The farming machine may be configured to only begin autonomously implementing farming actions if a manager of the farming machine verifies the environment. That is, a manager of the farming machine must verify that there are no obstacles in obstructed and/or unobstructed views of the farming machine. In essence, the manager must walk around the farming machine to verify that there are no obstacles in areas undetectable by the detection system. In some configurations, the verification process may include playing sirens and flashing lights to make it apparent that the farming machine is about to begin autonomously farming. The lights and sirens make it more likely that any humans in the environment will exit the environment.

As part of the verification process, the farming machine may communicate with a control system operated by the manager. That is, the farming machine may transmit and receive information from a control system operated by a manager. For example, the farming machine may transmit a request for the manager to verify the environment, and the farming machine may receive a verification of the environment in response (once the manager verifies the environment).

VI. Generating a Virtual Safety Bubble

The farming machine includes a virtual safety bubble generation module configured to generate a virtual safety bubble. A virtual safety bubble is an area in the environment which enables the farming machine to operate autonomously without colliding with obstacles. A virtual safety bubble may be an area in the environment (1) directly surrounding the farming machine, (2) in a forward path of the farming machine, (3) in a backward path from the farming machine, (4) along an expected path of the farming machine, and/or some area in the environment.

The farming machine generates the virtual safety bubble based on the configuration of the farming machine. Here, "configuration" is a term used to describe several aspects of the farming machine, implement, and environment which can be used to generate the virtual safety bubble. A nonexhaustive list of aspects of the farming machine configuration that may affect the virtual safety bubble follows.

Machine Path. The machine path may describe a current path of a machine or an expected path of the machine. The machine path may be in any direction relative to the current position of the farming machine. Additionally, the virtual safety bubble for the machine path may consider machine characteristics of the farming machine. E.g., the virtual safety bubble for a large farming machine along its machine path is larger than that of a smaller farming machine.

Velocity. Velocity may be a current or scheduled velocity of the farming machine. As implemented by the farming machine, velocity may be a scalar or a vector.

Acceleration. Acceleration be a current or scheduled accretion of the farming machine. As implemented by the farming machine, acceleration may be a scalar or a vector.

Expected Obstacle Characteristics. Expected obstacle characteristics are characteristics of obstacles a farming machine may expect to find in its environment. For instance, a farming machine operating near building may expect to find different obstacles than one operating in a field. As such, each environment may have correspondingly different virtual safety bubbles.

Implement Type. Implement type is the type of implement being employed by the farming machine (if any). As an example, an implement may be a tiller, a seeder, a sprayer, etc. Accordingly, each implement may indicate parameters for their virtual safety bubbles.

Mounting Mechanism Type. Mounting mechanism type describes how various parts of the farming machine are attached to the structure. For instance, a mounting mechanism may be a hitch, and the hitch may be a mobile hitch or a static hitch. Accordingly, the type of mounting mechanism may indicate parameters for the virtual safety bubble.

Type of Farming Actions. Farming actions are described in detail above. Different farming actions may indicate different parameters for the virtual safety bubble. For instance, a virtual safety bubble for spraying weeds may be different than a virtual safety bubble for tilling a field. The farming machine's control system may determine a direction that a farming action would face to aid in determination of the parameters of the virtual safety bubble (e.g., the shape and the size of the virtual safety bubble). For example, the control system can set a shape of the virtual safety bubble to be predominantly in front of the farming machine based on the farming action being tilling. In another example, the control system can set a shape of the virtual safety bubble with a radius around the treatment mechanism in a spraying mode. The control system may also access a physical configuration of the farming machine based on the farming action being performed, e.g., a first farming action may place the farming machine in a first physical configuration, whereas a second farming action may place the farming machine in a second physical configuration that is different than the first physical configuration.

Implementation Characteristics for Farming Actions. Implementation characteristics describes the particulars of how a farming machine implements a farming action. Some characteristics may include, for example, a spray speed of a spray nozzle, a head height of a harvester, etc.

Machine Characteristics for Farming Machine. Machine characteristics describe the physical manifestation of the farming machine. That is, the size, shape, and spatial characteristics of the farming machine. The farming machine may store a digital representation of its machine characteristics that may be accessed when generating a virtual safety bubble.

Implement Characteristics for Implement. Implement characteristics describe the physical manifestation of the farming implement. That is, the size, shape, and spatial characteristics of the farming implement. The farming implement may store a digital representation of its implement characteristics that may be accessed when generating a virtual safety bubble.

Characteristics of Other Attachments. Other attachments may include any one component that is attached to the farming machine or implement. For example, the farming machine can be rigged with additional flood lights which may expand the dimensional profile of the farming machine.

Environment Characteristics. Environment characteristics describes the working environment of the farming machine. Some example environment characteristics include the size, shape, and spatial characteristics of the field in which the farming machine operates. Environment characteristics may also describe the weather.

Obstacle Type. Obstacles may be dynamic (i.e., moving) or static (i.e., unmoving). The farming machine may generate a different virtual safety bubble for an identified dynamic and/or static obstacle.

Manager Input. Manager input is information from the manager that may be used to generate a virtual safety bubble. Manager input may include any of the aforementioned configuration information.

Local Regulations. The control system can maintain a log of different local regulations depending on a geographical location of the farming machine. In one or more examples, a first country may have different regulations than a second country; a first state may have different regulations than a second state; a first city may have different regulations than a second city; or some combination thereof. The different regulations can limit the farming actions, e.g., speed limit, permitted period of operation, permitted weather for operation, other regulations, etc.

To refresh, the farming machine utilizes a machine configuration to determine a virtual safety bubble around the farming machine. The machine configuration may be any of the aforementioned configuration information. The virtual safety bubble may be represented as a relative distance, an absolute distance, a depth, a time (e.g., based on velocity and/or acceleration), legal requirements, or any other suitable metric for quantifying the virtual safety bubble.

The farming machine continually monitors the environment such that no obstacles are within the virtual safety bubble. That is, the detection mechanisms capture images, the farming machine applies an obstacle identification model to the images and identifies and locates an obstacle in the environment. If the farming machine identifies an obstacle in the virtual safety bubble, it terminates operation of the farming machine.

Notably, the farming machine may treat obstacles and objects in different manners. For instance, a farming machine may identify a large pile of leaves in a virtual safety bubble, identify it as an object, and continue performing farming actions because the leaves would not damage the farming machine on contact. To the contrary, a farming machine may identify a log in a virtual safety bubble, identify it as an object, classify it as an obstacle, and cease performing farming actions because the log would damage the farming machine in a collision.

In some examples, the farming machine may treat different types of obstacles in different manners. For instance, a dynamic obstacle (e.g., a human, a moving car, etc.) may warrant different virtual safety bubbles relative to a static obstacle (e.g., a log, a chair, etc.). Naturally, dynamic obstacles likely indicate larger virtual safety bubbles because of their ability to move through the environment, while static obstacles likely indicate smaller virtual safety bubbles because they remain stationary. In some examples, the farming machine may treat humans in a different manner than all other obstacles. For instance, the farming machine may generate a virtual safety bubble for humans that is larger than all other objects and obstacles. In one or more embodiments, the farming machine may generate a plurality of virtual safety bubbles utilized concurrently. A first virtual safety bubble may be defined for a first class of objects (e.g., humans), and a second virtual safety bubble may be defined for a second class of objects (e.g., obstacles).

Figure 4A:
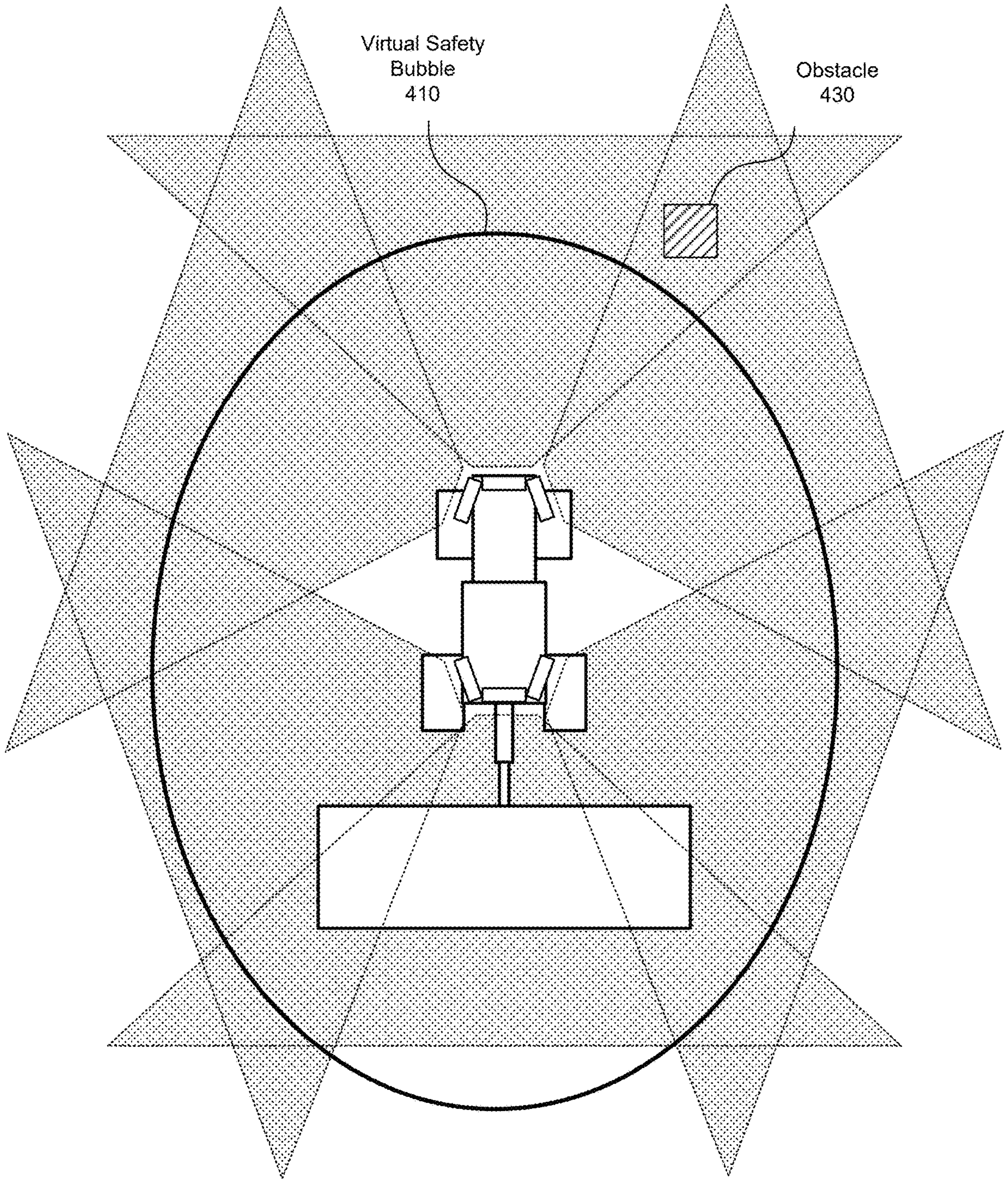
FIG. 4A illustrates a first virtual safety bubble around a farming machine, in accordance with one or more embodiments.
Figure 4B:
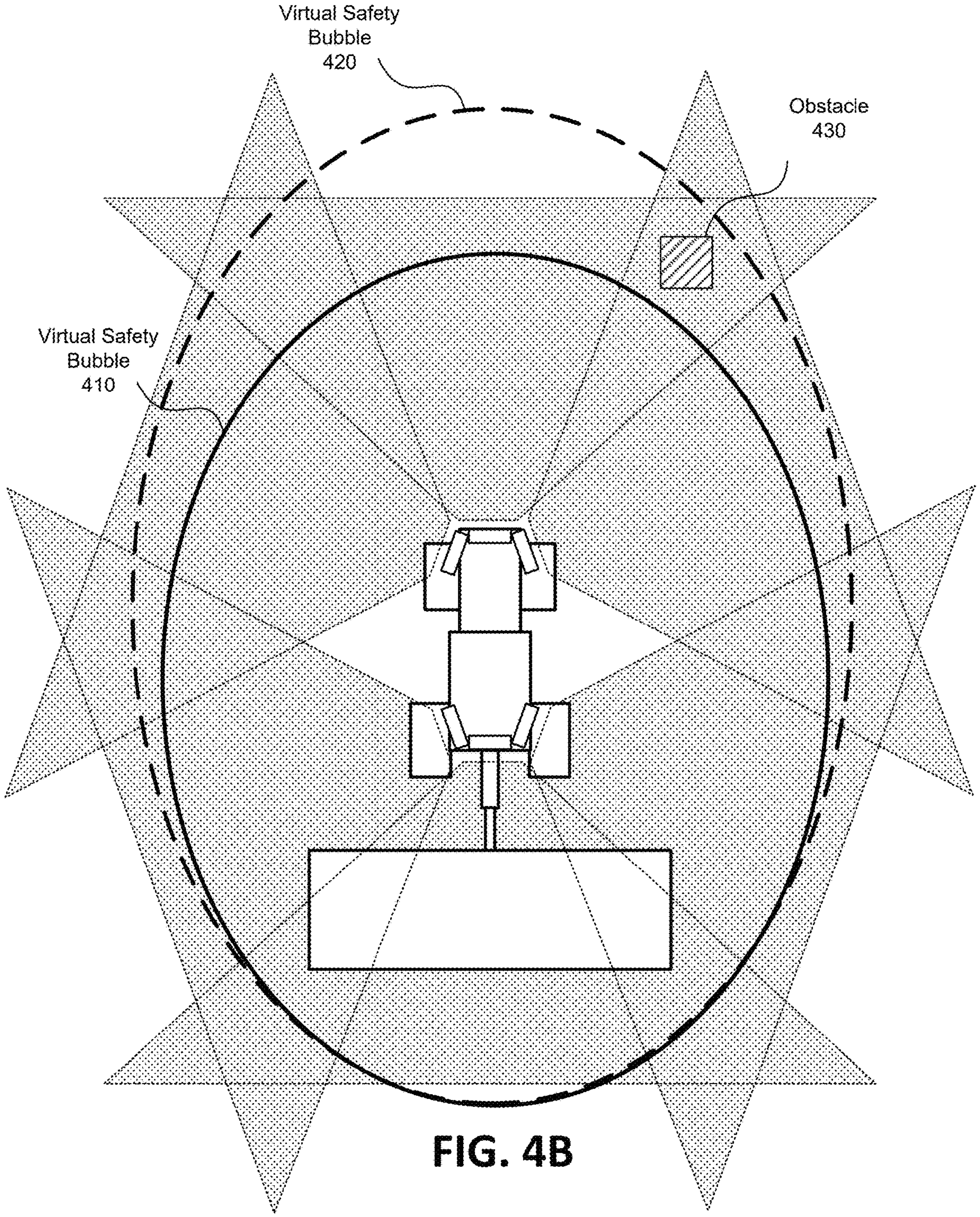
FIG. 4B illustrates dynamically modifying the virtual safety bubble around a farming machine, in accordance with one or more embodiments.

FIGS. 4A and 4B illustrate dynamically modifying the virtual safety bubble around a farming machine. In FIGS. 4A & 4B, the farming machine is similarly configured to the farming machine in FIG. 3A, having a detection system comprising at least six detection mechanisms compositing fields of view to create the 360-degree field of view all around the farming machine.

FIG. 4A illustrates a first virtual safety bubble 410 around a farming machine, in accordance with one or more embodiments. The farming machine is autonomously implementing farming actions in the environment (e.g., tilling) using a particular configuration. The configuration of the farming machine describes its spatial characteristics (e.g., positions of tires, implements, etc.), the farming actions to implement, and the implementation characteristics for those farming actions (e.g., type, path, velocity, acceleration, implementation settings, etc.).

Based on the configuration, the farming machine determines a first virtual safety bubble 410. The first virtual safety bubble 410 is represented by the oval surrounding the farming machine. The first virtual safety bubble 410 represents a safe operational area where there are no identified obstacles. To maintain the first virtual safety bubble 410, the farming machine continuously captures images and applies an obstacle detection model to locate obstacles in the environment. If the farming machine detects an obstacle 430 in the first virtual safety bubble 410 the farming machine may terminate operation. That is, the farming machine ceases implementation of farming actions and may cease movement. Implementing the virtual safety bubble beyond the blind spots prevents any obstacle from being obscured and missed by the detection system, which could cause a collision and damage to the farming machine, object, or individual.

FIG. 4B illustrates dynamically modifying the virtual safety bubble around a farming machine, in accordance with one or more embodiments. To illustrate, imagine that the farming actions implemented by the farming machine in FIG. 4A are performed with a first configuration with the first virtual safety bubble 410. For example, the farming machine is performing farming actions at a first velocity in the environment. Now consider, for example, the farming machine changes its configuration. For example, the manager instructs the farming machine to travel more quickly in the environment as it implements farming actions. As another example, the farming machine enters an environment populated with cattle or other animals. The farming machine may change from the first configuration to a second configuration, creating a larger virtual safety bubble.

The farming machine calculates a second virtual safety bubble 420 to account for the second configuration. The second virtual safety bubble 420 is illustrated by the dashed oval in FIG. 4B. Notably, the second virtual safety bubble 420 is larger than the original virtual safety bubble, e.g., to account for the farming machine's higher velocity. This second virtual safety bubble 420 may be generated for several reasons, one of which is to allow for the greater time required for implementing a corrective action when an obstacle is detected due to a higher speed.

To illustrate, recall the obstacle 430 in FIG. 4A. There, the obstacle 430 was outside the first virtual safety bubble 410 and the farming machine would not cease operations. In FIG. 4B the farming machine is moving faster. If the second virtual safety bubble 420 was the same size as the first virtual safety bubble 410, the farming machine may collide with the obstacle 430 before it can take corrective action. However, because the second virtual safety bubble 420 is larger than the first virtual safety bubble 410, the farming machine identifies the obstacle 430 and may take corrective action before colliding with the obstacle 430.

VII Exemplary Dynamic Safety Bubble Workflow

Figure 5:
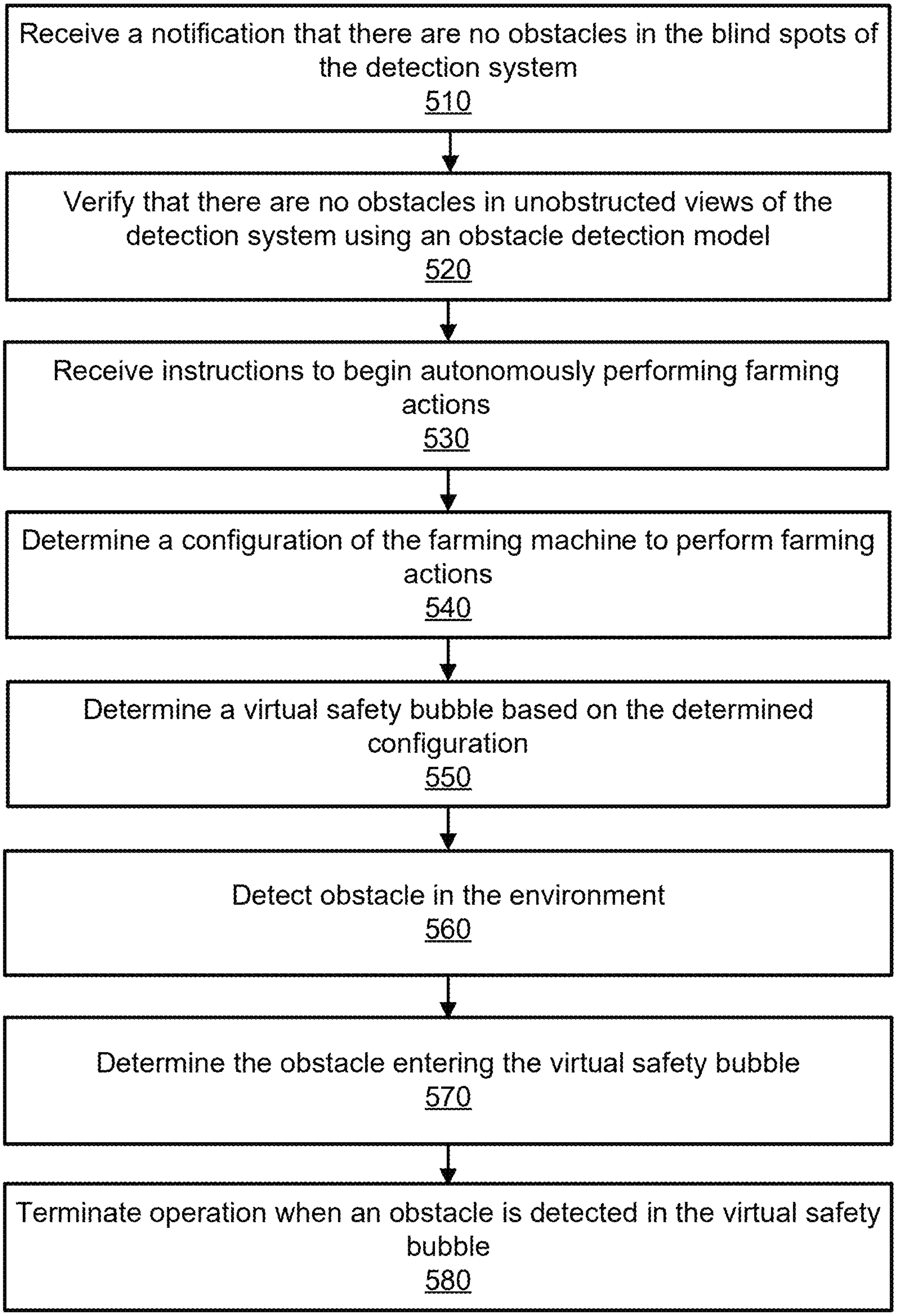
FIG. 5 illustrates a flowchart of the method for dynamically modifying the virtual safety bubble during operation of the farming machine, in accordance with one or more embodiments.

The farming machine may be configured to generate a virtual safety bubble around the farming machine that allows for safe, autonomous implementation of farming actions. FIG. 5 illustrates a process flow for generating a virtual safety bubble, according to one example embodiment. Although FIG. 5 is described from the perspective of the farming machine, any component of the farming machine may perform one or more of the steps (e.g., the control system 130 or 210). In other embodiments, there may be additional or fewer steps. In other embodiments, the steps listed may occur in a different order.

To provide context, an autonomous farming machine is configured with a detection system. The detection system may comprise six cameras positioned around the farming machine that provide the farming machine a 360-degree field view of the environment. Within the field of view are obstructed views and unobstructed views. Obstructed views are image data within the field of view where an object in the environment obscures portions of the environment behind the object from the detection mechanism (e.g., behind a tire, or under the cab). Unobstructed views are image data within the field of view that are not obstructed.

The farming machine receives a notification to begin autonomously implementing farming actions in the environment. In response, the farming machine transmits a request to verify that the operating environment of the farming machine is safe. Verification may include transmitting a notification to the manager to verify that there are no obstacles in the obstructed views of the detection system. The manager verifies that there are no obstacles and transmits a notification to the farming machine reflecting the verification.

The farming machine receives 510 a notification that there are no obstacles in the blind spots of the detection system. The manager may provide such notification, e.g., via a GUI running on a mobile phone application.

The farming machine verifies 520 that there are no obstacles in the unobstructed views of the environment using an obstacle detection model. That is, the farming machine captures one or more images of the environment using the detection system and applies an obstacle detection model to the images. The obstacle detection model analyzes the images to determine whether any of the pixels in the image represent an obstacle.

The farming machine receives 530 instructions from the farmer to begin autonomously performing farming actions in the field. In an example configuration, the farming machine may be unable to begin autonomous performance without a verification from the manager that there are no obstacles in the obstructed views and verifying (itself) that there are no obstacles in the unobstructed views.

The farming machine determines 540 a configuration of the farming machine to perform the prescribed farming actions in the environment. Determining the configuration may include accessing an implement capability, a computer model of the farming machine, types of farming actions, and implementation characteristics defining how the farming machine implements the farming actions (e.g., speed, path, etc.).

The farming machine determines 550 a virtual safety bubble based on the determined configuration. The virtual safety bubble represents an area surrounding the farming machine where, if an obstacle is detected in the area, the farming machine will cease operation. The virtual safety bubble may be a distance, a time, a depth, a relative position, or any other measure of a virtual safety bubble.

The farming machine detects 560 an obstacle in the environment based on applying the obstacle detection model to the images captured by the detection system. As the farming machine performs farming actions in the field the detection mechanism continuously captures images of the environment. Moreover, the farming machine continuously applies the obstacle detection model to the captured images to identify obstacles in the environment.

The farming machine determines 570 that an obstacle is within the virtual safety bubble. The farming machine may determine that the obstacle has breached the virtual safety bubble if a depth of the obstacle is at or below the virtual safety bubble. The depth may be determined via a detection and ranging sensor, or a depth estimation model applied to the images.

In response to determining that an obstacle is in the virtual safety bubble, the farming machine terminates 560 operation. That is, the farming machine stops implementing the farming actions in the field. In other embodiments, the farming machine may enact other preventive measures in response to detecting an obstacle having breached the virtual safety bubble.

VIII. Example Interactions with Manager

As described above the farming machine may interact with a manager when performing farming actions in the field. Some of these interactions may be keyed to when the farming machine detects an object in its virtual safety bubble. Once detected, the farming machine may transmit to, or receive information from, a manager of the farming machine. The farming machine may also transmit and receive information when establishing a virtual safety bubble around the farming machine. FIGS. 6-10 illustrate various examples of a client device interacting with a farming machine.

Figure 6A:
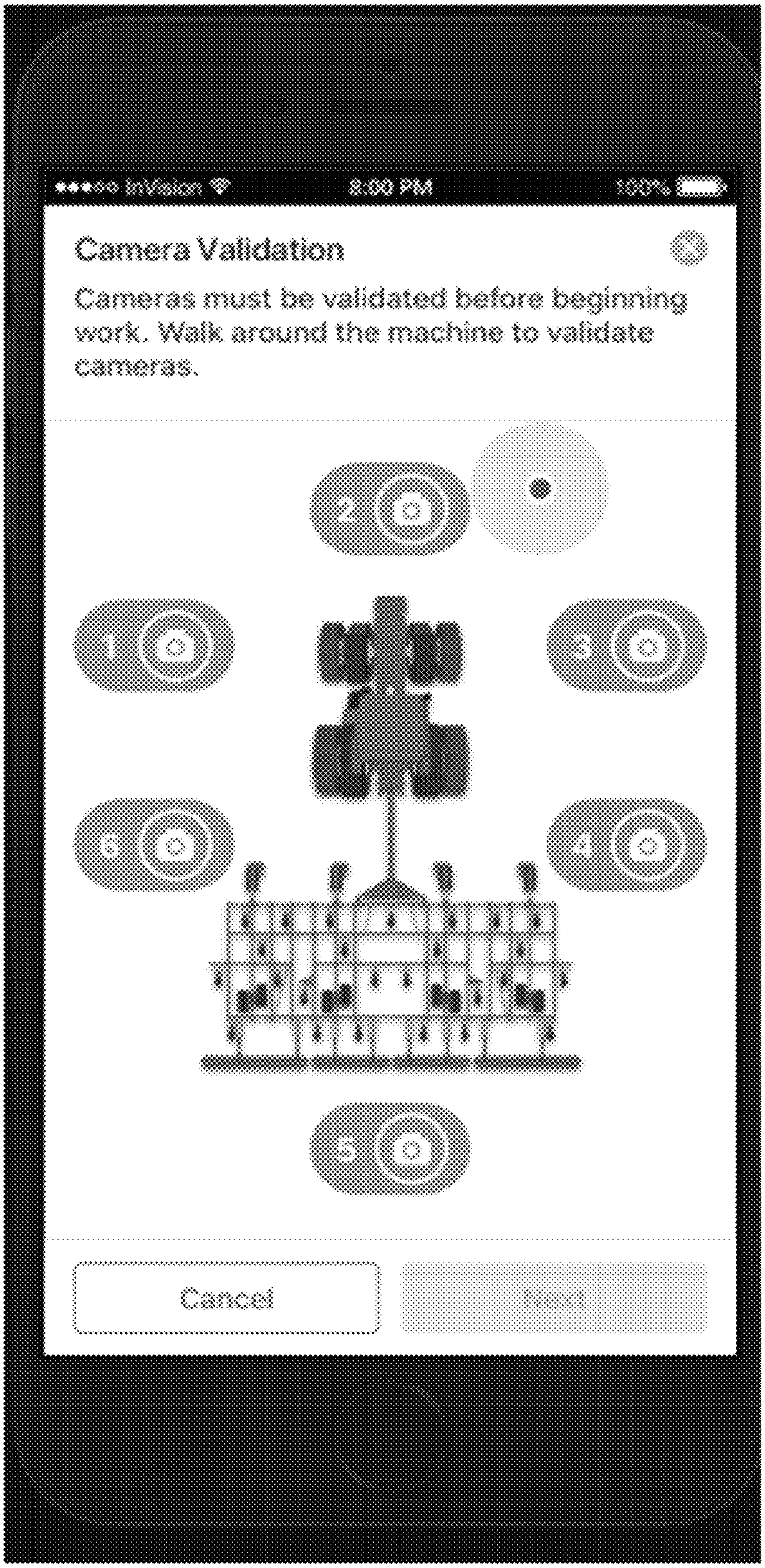
FIGS. 6A-6B illustrates a verification process of the detection systems of the farming machine, in accordance with one or more embodiments.
Figure 6B:
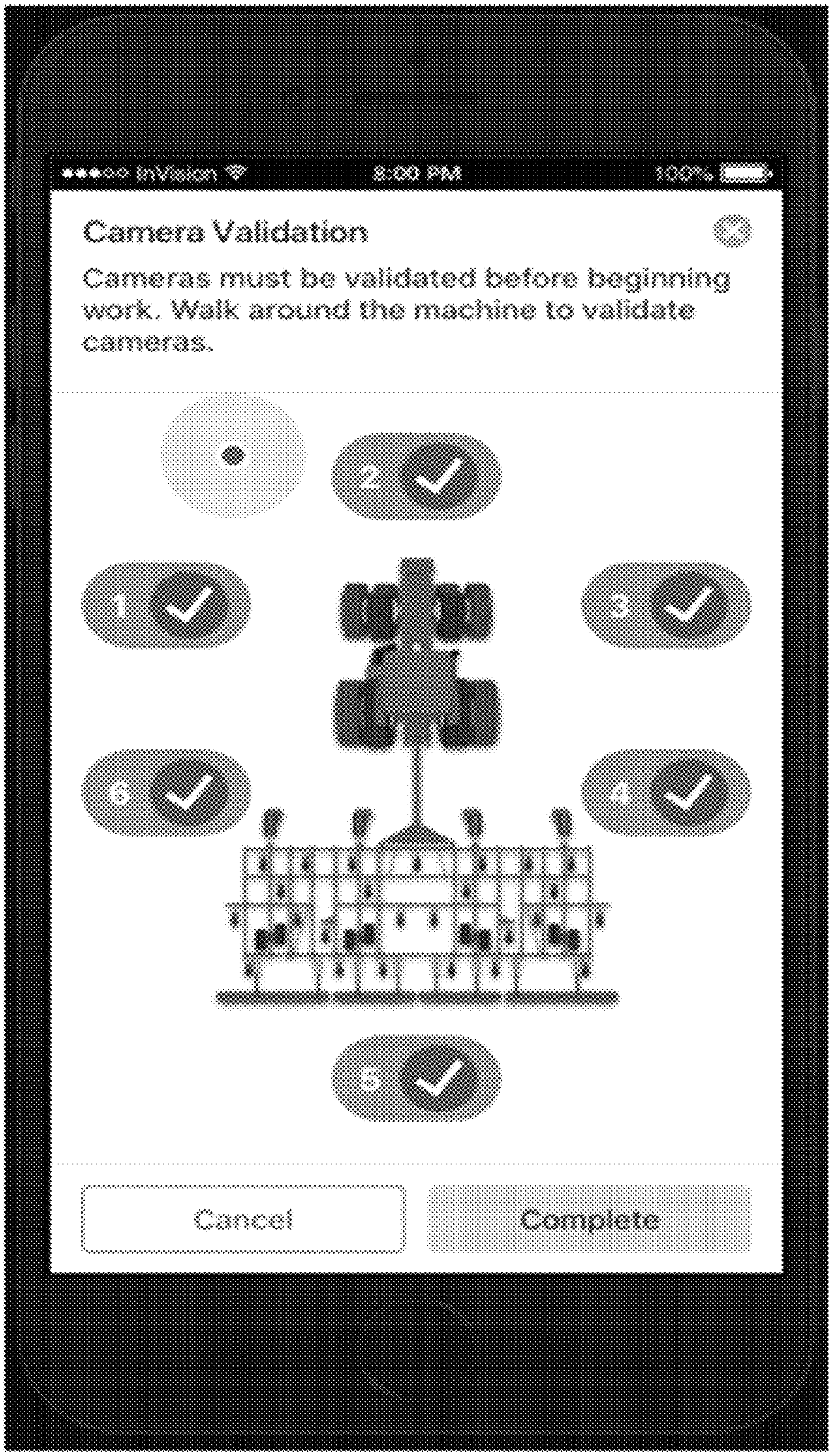

FIGS. 6A-6B illustrates a verification process of the detection systems of the farming machine. The verification process may include verifying that there are no obstacles visible in obstructed views of the farming machine. In FIG. 6A, the GUI illustrates the farming machine and implement with six zones where the cameras are positioned and directed. The GUI prompts the manager to "walk around the machine to validate the cameras." As the manager physically walks around the farming machine, each of the detection mechanisms (e.g., cameras) may capture data that is used by the farming machine to validate the detection mechanisms' ability to detect the manager. FIG. 6B illustrates a completed walk-around with checkmarks next to each detection mechanism (e.g., camera).

Figure 7:
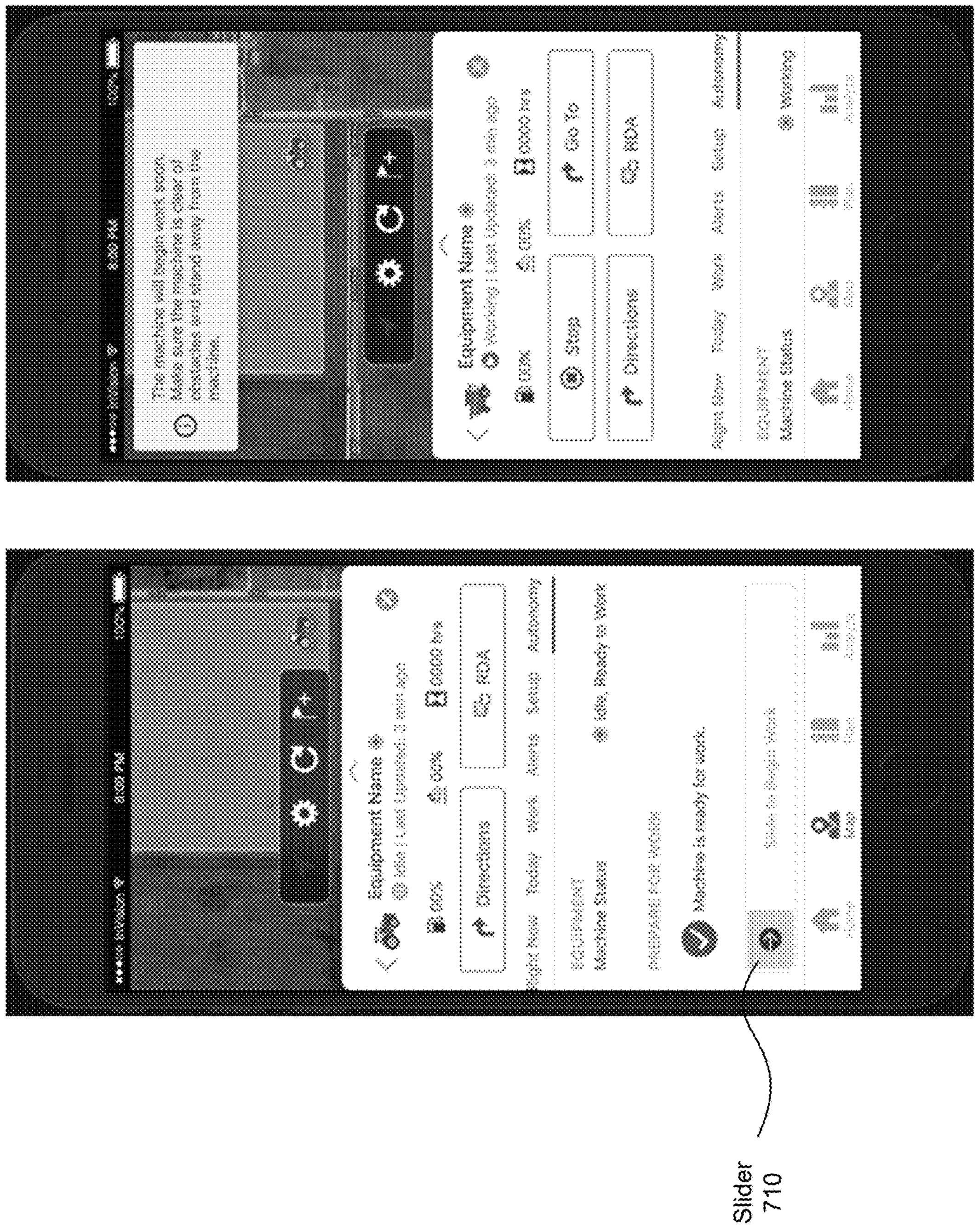
FIG. 7 illustrates a notification that the farming machine is establishing the virtual safety bubble, in accordance with one or more embodiments.

FIG. 7 illustrates a notification that the farming machine is establishing the virtual safety bubble. That is, once implemented, the virtual safety bubble will be maintained according to the methods described above. So, if a human or object enters the virtual safety bubble the farming machine may take corresponding actions as outlined above. The left panel shows a slider 710 that allows for a manager to engage the farming machine in the farming actions. Sliding the slider 710 to the right is an embodiment of step 530 in FIG. 5 of providing and receiving instructions to begin autonomously performing farming actions.

Figure 8:
FIG. 8 illustrates a notification transmitted to a client device regarding a detected obstacle, in accordance with one or more embodiments.

FIG. 8 illustrates a notification transmitted to a client device regarding a detected obstacle. The notification may occur when the object is detected within the virtual safety bubble. The notification may include characteristics describing the detected object. On the left panel, an obstacle notification 810 is shown as a pop-up notification on a mobile device. Upon receiving a click from the manager, the mobile application can expand to provide a detailed obstacle report 820, shown in the middle panel, providing additional details on the detected obstacle. The detailed obstacle report 820 may include an option to access an obstacle video feed 830 captured by a detection mechanism, shown in the right panel. The detailed obstacle report 820 can further include preventive measures that can be undertaken by the farming machine.

Figure 9A:
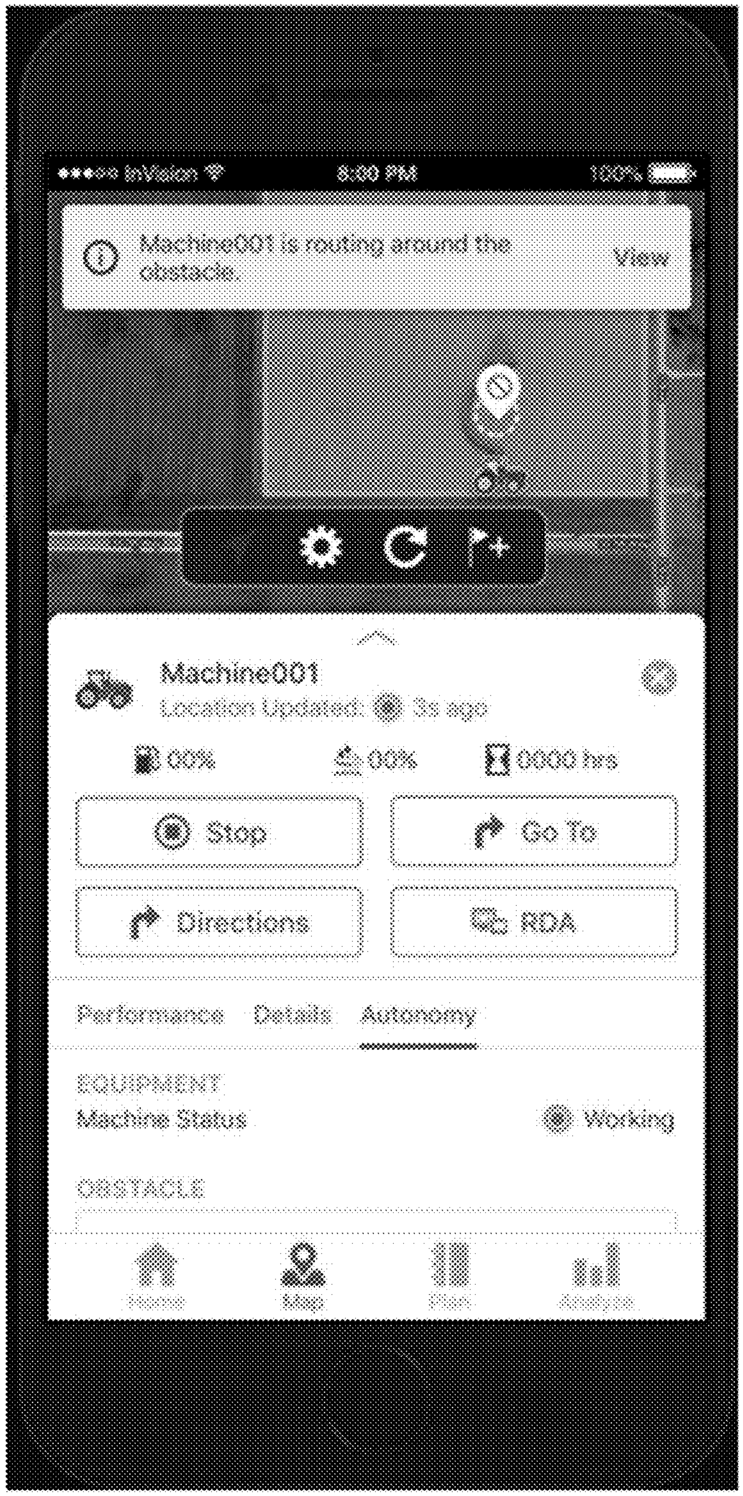
FIGS. 9A-9C illustrates actions the farming machine may implement when detecting an object in the virtual safety bubble, in accordance with one or more embodiments.
Figure 9B:
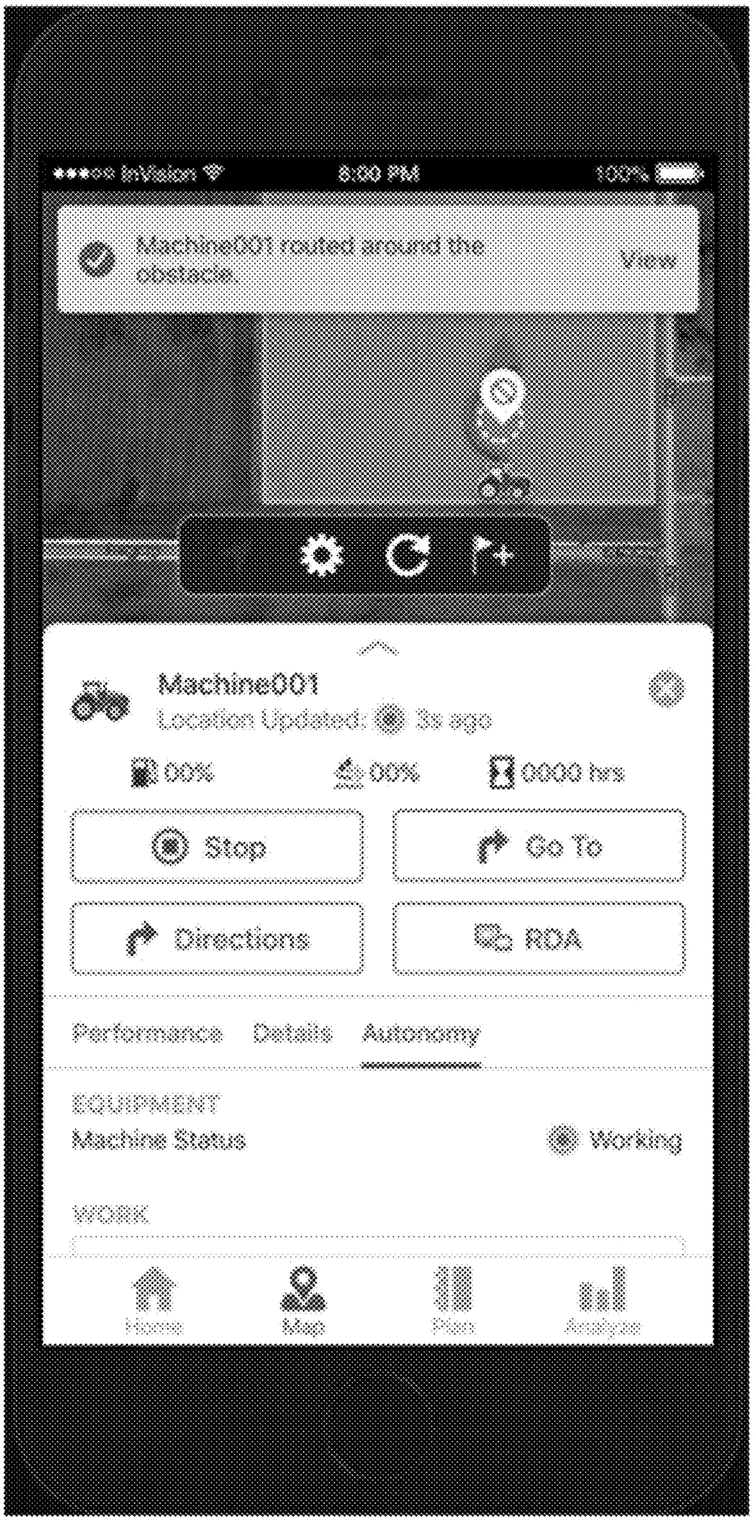
Figure 9C:
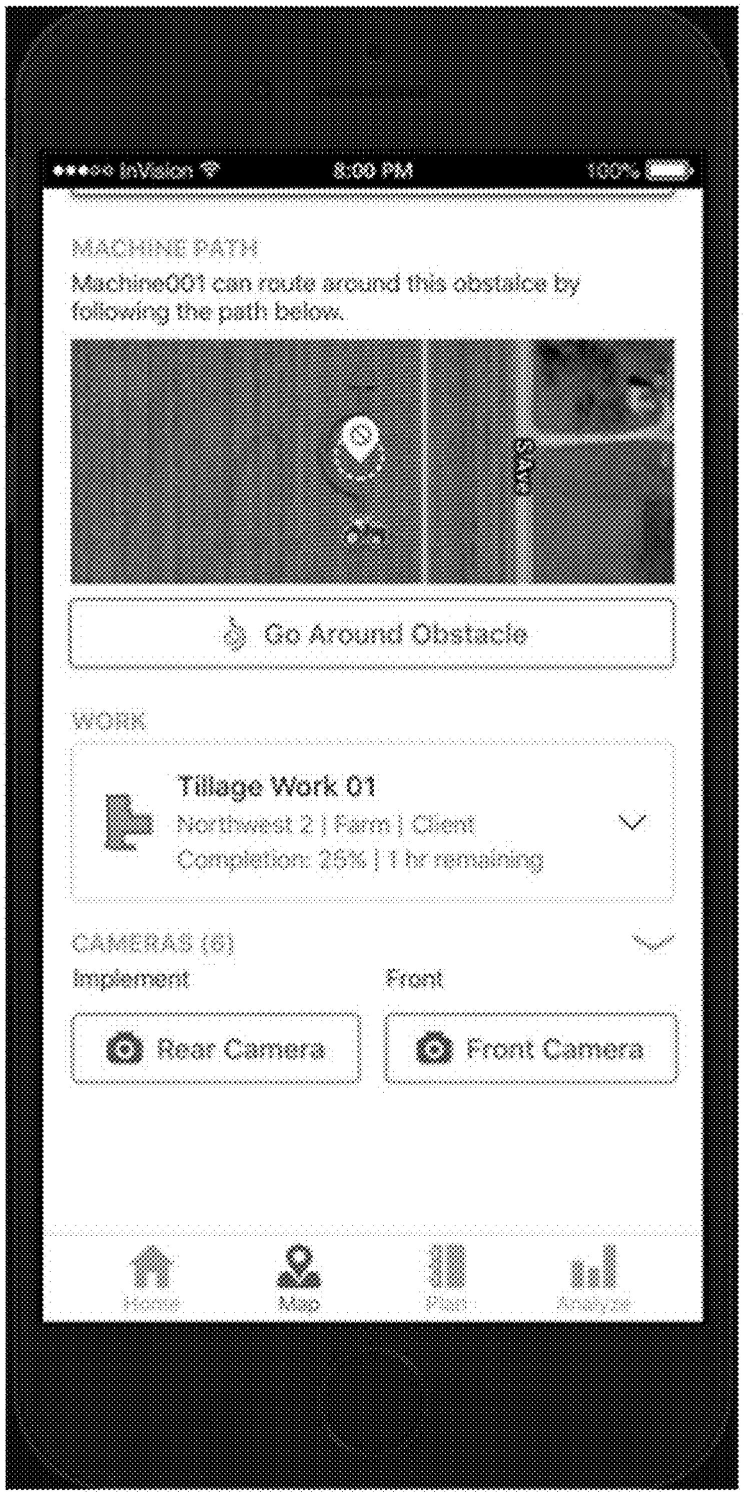

FIGS. 9A-9C illustrates actions the farming machine may implement when detecting an object in the virtual safety bubble. For example, the farming machine may route around the object in the field. The GUI can illustrate a route around the obstacle and progress of the farming machine in navigating the route, shown in the left panel. Upon completion of the route, the GUI can notify the manager of successful routing around the obstacle, shown in the middle panel. The right panel illustrates another example screenshot that illustrates an alternative route around an obstacle with an actionable option to instruct the farming machine to enact the prevent measure of navigating around the obstacle.

Figure 10A:
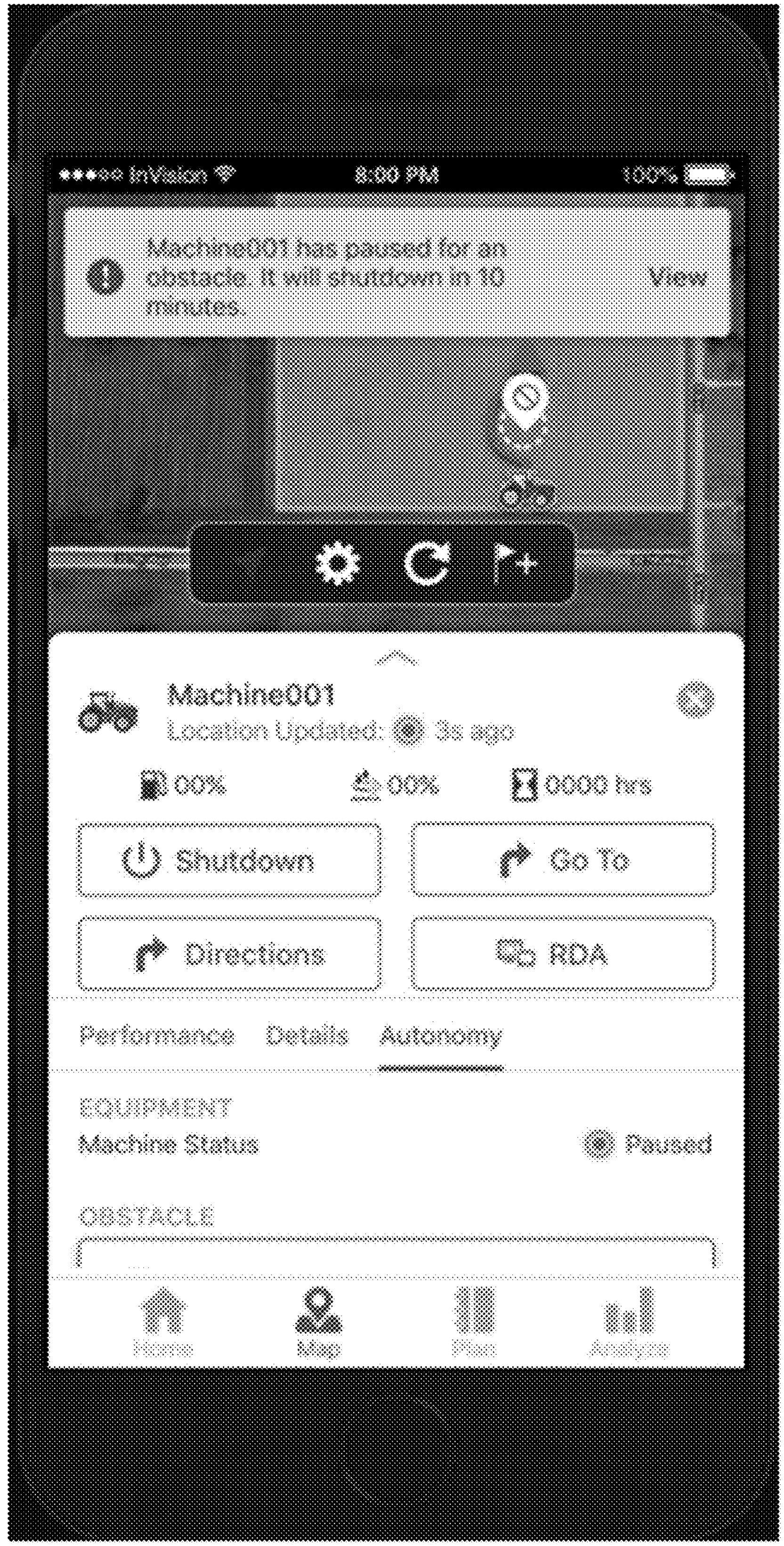
FIGS. 10A-10C illustrates actions the farming machine may implement when detecting an object in the virtual safety bubble, in accordance with one or more embodiments.
Figure 10B:
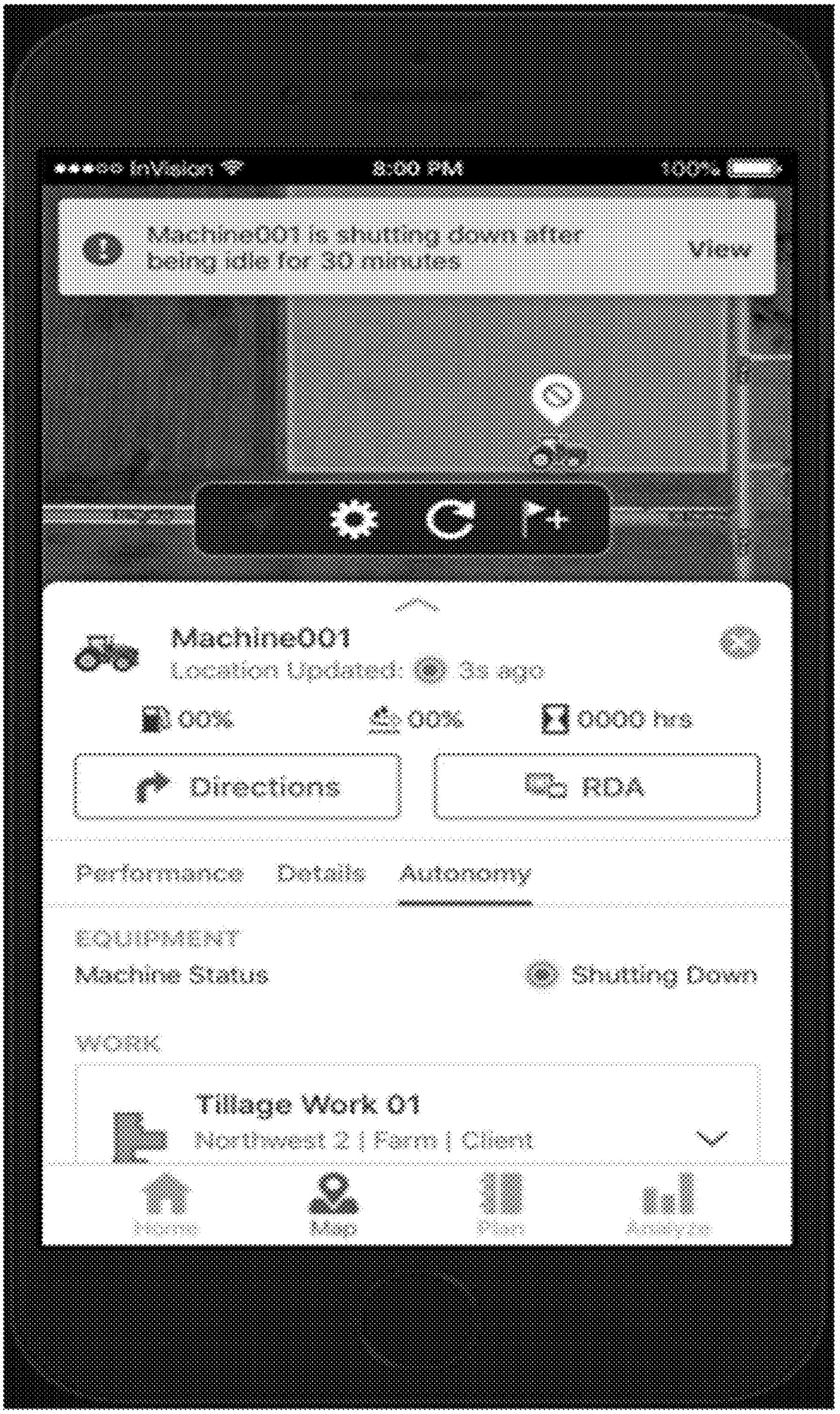
Figure 10C:
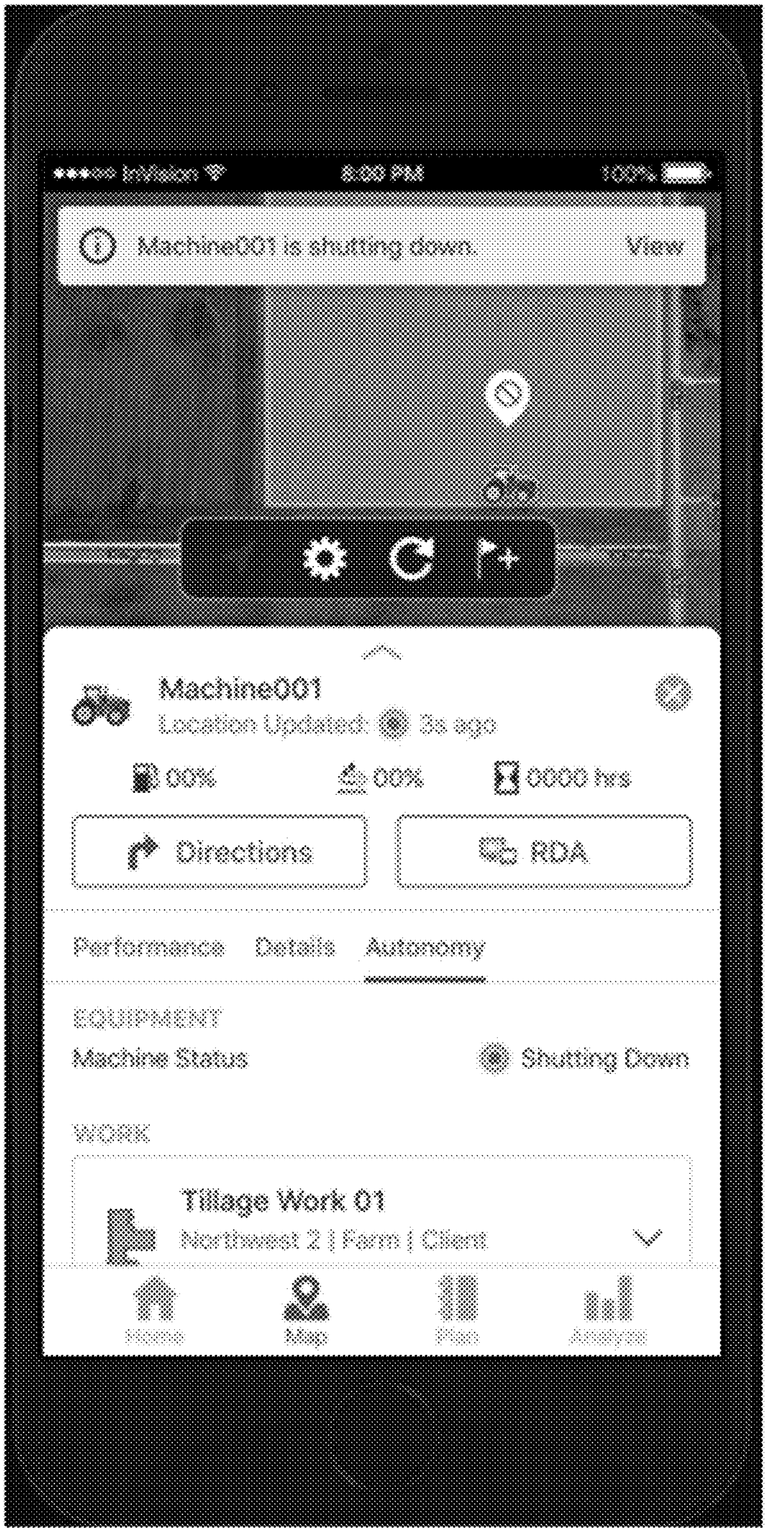

FIGS. 10A-10C illustrates actions the farming machine may implement when detecting an object in the virtual safety bubble. For example, the farming machine may cease operation in the field. In the left panel, the GUI illustrates that the farming machine has ceased operations (paused) in response to detection of an obstacle. In the middle panel, the GUI indicates the farming machine is shutting down after being "idle for 30 minutes" after having paused due to detecting the obstacle. In the right panel, the GUI indicates that the farming machine is "shutting down," e.g., switching to an inactive state.

IX. Exemplary Navigational Workflow

Figure 11:
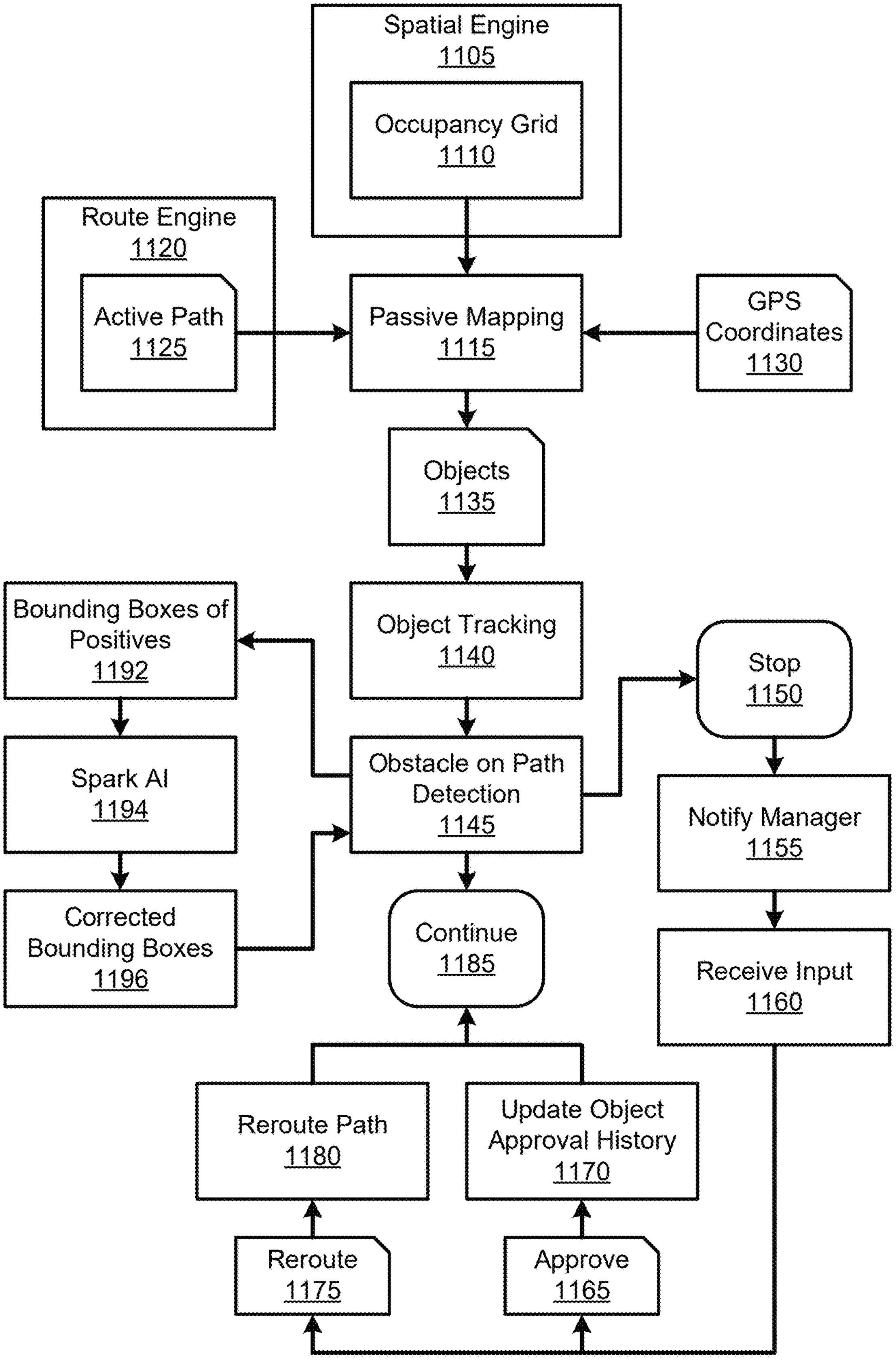
FIG. 11 illustrates a navigational workflow of farming machine, in accordance with one or more embodiments.

FIG. 11 illustrates a navigational workflow 1100 of farming machine, in accordance with one or more embodiments. The farming machine may implement the control system 210 as described in FIG. 2. In other embodiments, the navigational workflow 1100 may include additional steps, fewer steps, steps in a different order, or some combination thereof. Although the following description is in the perspective of the control system 210, the farming machine at large may also perform the navigational workflow (e.g., via distributed systems in contrast to one control system).

The control system 210 begins by detecting objects in an operating environment of the farming machine. The control system 210 utilizes a spatial engine 1105 that generates an occupancy grid 1110. The occupancy grid 1110 is a virtual representation of the spatial environment of the farming machine. The control system 210 may further utilize a route engine 1120 that generates an active path 1125 for the farming machine to travel on. The controls system 210 may further receive GPS coordinates 1130, e.g., from a GPS receiver. The control system 210 performs passive mapping 1115, detecting objects 1135 in the environment of the farming machine. The control system 210 performs object tracking 1140, e.g., by constantly updating a position of an object relative to the farming machine within the occupancy grid 1110.

In one or more embodiments, the control system 210 may utilize object tracking 1140 to determine whether an object may have entered a blind spot. The control system 210 may track an object present in a plurality of images. Upon determining that the object has disappeared from view, i.e., no longer present in any of the images, the control system 210 may determine the object to have entered a blind spot. In other embodiments, the control system 210, knowing that an object is likely in a blind spot, may prompt a user to verify whether the object has been cleared or remains in the blind spot. In response to the user providing an input indicating the object has been cleared, then the control system 210 may continue 1185 operation. In response to the user providing an input indicating that the object remains in the blind spot, the control system 210 may reroute. The control system 210 may request further input from the manager via step 1155.

The control system 210 detects an obstacle on the active path 1145. As noted, the control system 210 may utilize a virtual safety bubble to detect when obstacles have breached the virtual safety bubble. In response to detecting the obstacle has breached the virtual safety bubble, the controls system 210 stops 1150 operations (or enact other preventive measures). The control system 210 notifies 1155 the manager of the obstacle in path (e.g., as shown in FIGS. 6-10). The control system 210 receives 1160 input from the manager, e.g., to approve 1165 of the object, i.e., to override object as not an obstacle, allowing for continued operation 1185. Otherwise, the manager may provide input to reroute 1175. In response, the control system 210 may reroute path 1180 around the obstacle. Once cleared, the controls system 210 can continue 1185 farming actions.

In one or more embodiments, the control system 210 can routinely update bounding boxes of the objects. The control system 210 can routinely evaluate whether a bounding box for an object is accurately defined for the object. If not accurately defined, the control system 210 may implement Spark AI 1194 to produce corrected bounding boxes 1196 for the various objects. Having accurate bounding boxes increases detect precision, i.e., when detecting the object breaches the virtual safety bubble.

X. Example Navigational Scenarios

Figure 12:
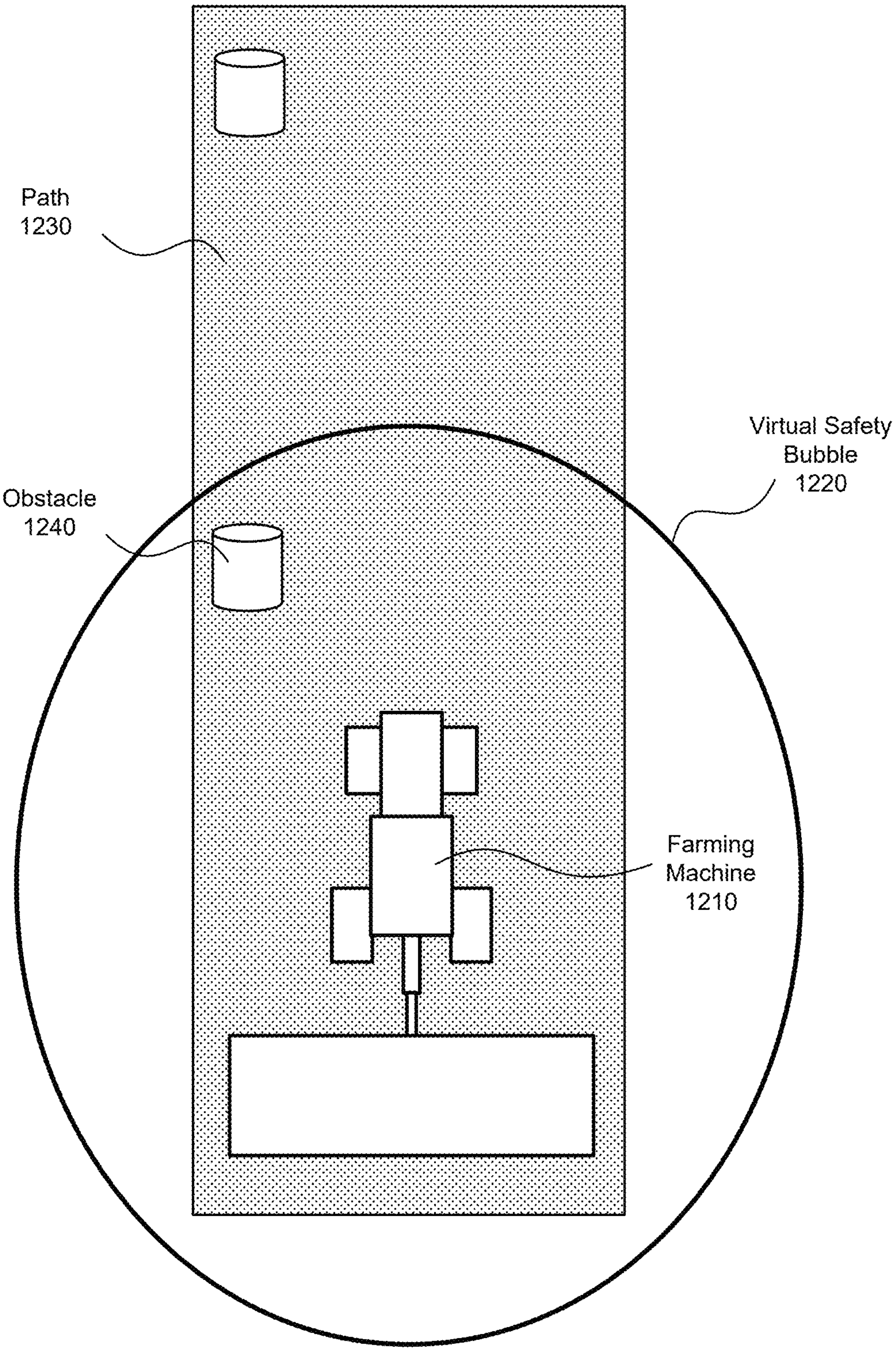
FIG. 12 illustrates navigation of a farming machine on-path on a straight path, in accordance with one or more embodiments.

FIG. 12 illustrates navigation of a farming machine 1210 on-path on a straight path 1230, in accordance with one or more embodiments. The farming machine 1210 is an embodiment of the farming machine 100 comprising the control system 210. The farming machine 1210 generates the virtual safety bubble 1220 to aid navigation of the farming machine 1210. As the farming machine 1210 is driving on the path 1230 and encounters an obstacle 1240 (i.e., the obstacle 1240 breaches the virtual safety bubble 1220), then the farming machine 1210 may cease operations and/or enact other preventive measures.

Figure 13:
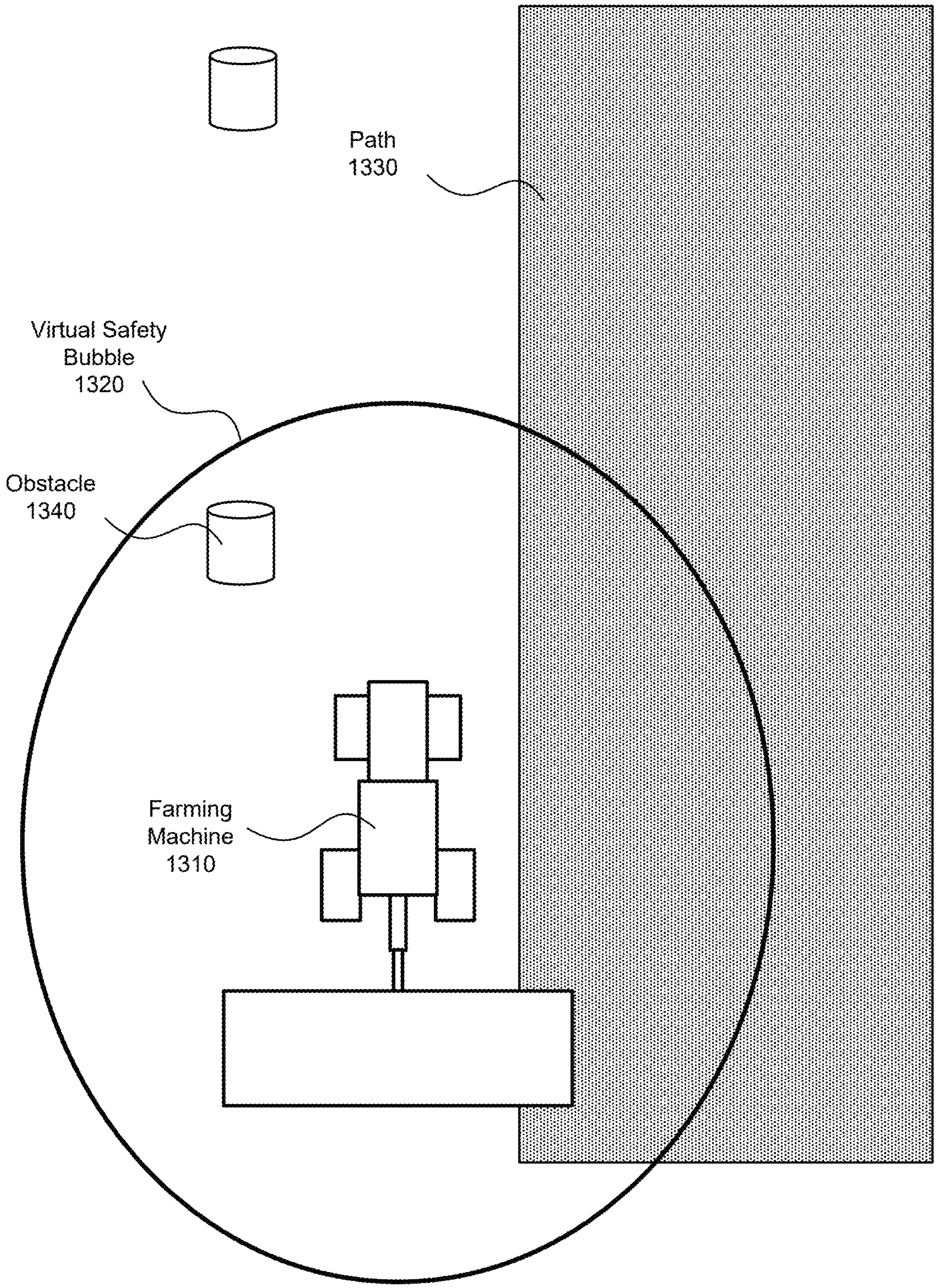
FIG. 13 illustrates navigation of a farming machine off-path on a straight path, in accordance with one or more embodiments.

FIG. 13 illustrates navigation of a farming machine 1310 off-path on a straight path 1330, in accordance with one or more embodiments. The farming machine 1310 is an embodiment of the farming machine 100 comprising the control system 210. The farming machine 1310 generates the virtual safety bubble 1320 to aid navigation of the farming machine 1310. In this scenario, the farming machine 1310 is significantly off-path. If the farming machine 1310 determines that it is off-path, then the farming machine 1310 may generate course-correction navigation instructions to route the farming machine 1310 back onto the path 1330. The farming machine 1310 may also cease operations and/or provide a notification to a manager indicating that the farming machine 1310 is off-path, requesting subsequent instructions. Even when off-path, if the farming machine 1310 encounters an obstacle 1340 (i.e., the obstacle 1340 breaches the virtual safety bubble 1320), then the farming machine 1310 may cease operations and/or enact other preventive measures.

Figure 14:
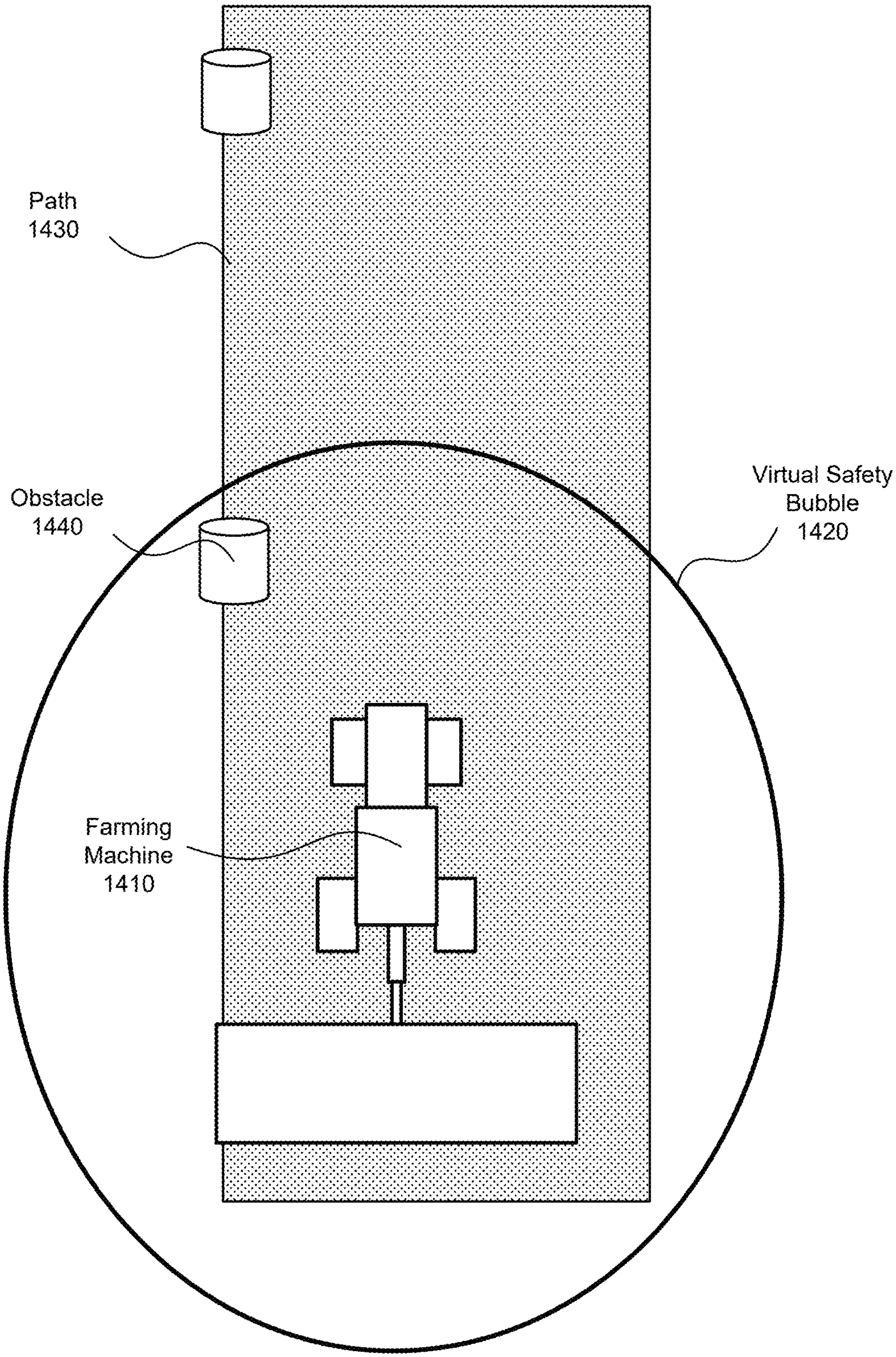
FIG. 14 illustrates navigation of a farming machine on-path and off-center of a straight path, in accordance with one or more embodiments.

FIG. 14 illustrates navigation of a farming machine 1410 on-path and off-center of a straight path 1430, in accordance with one or more embodiments. The farming machine 1410 is an embodiment of the farming machine 100 comprising the control system 210. The farming machine 1410 generates the virtual safety bubble 1420 to aid navigation of the farming machine 1410. In this scenario, the farming machine 1410 is on-path but off-center. If the farming machine 1410 determines that it is off-center, then the farming machine 1410 may generate course-correction navigation instructions to route the farming machine 1410 back onto the center of the path 1430. Even when off-path, if the farming machine 1410 encounters an obstacle 1440 (i.e., the obstacle 1340 breaches the virtual safety bubble 1420), then the farming machine 1410 may cease operations and/or enact other preventive measures.

Figure 15A:
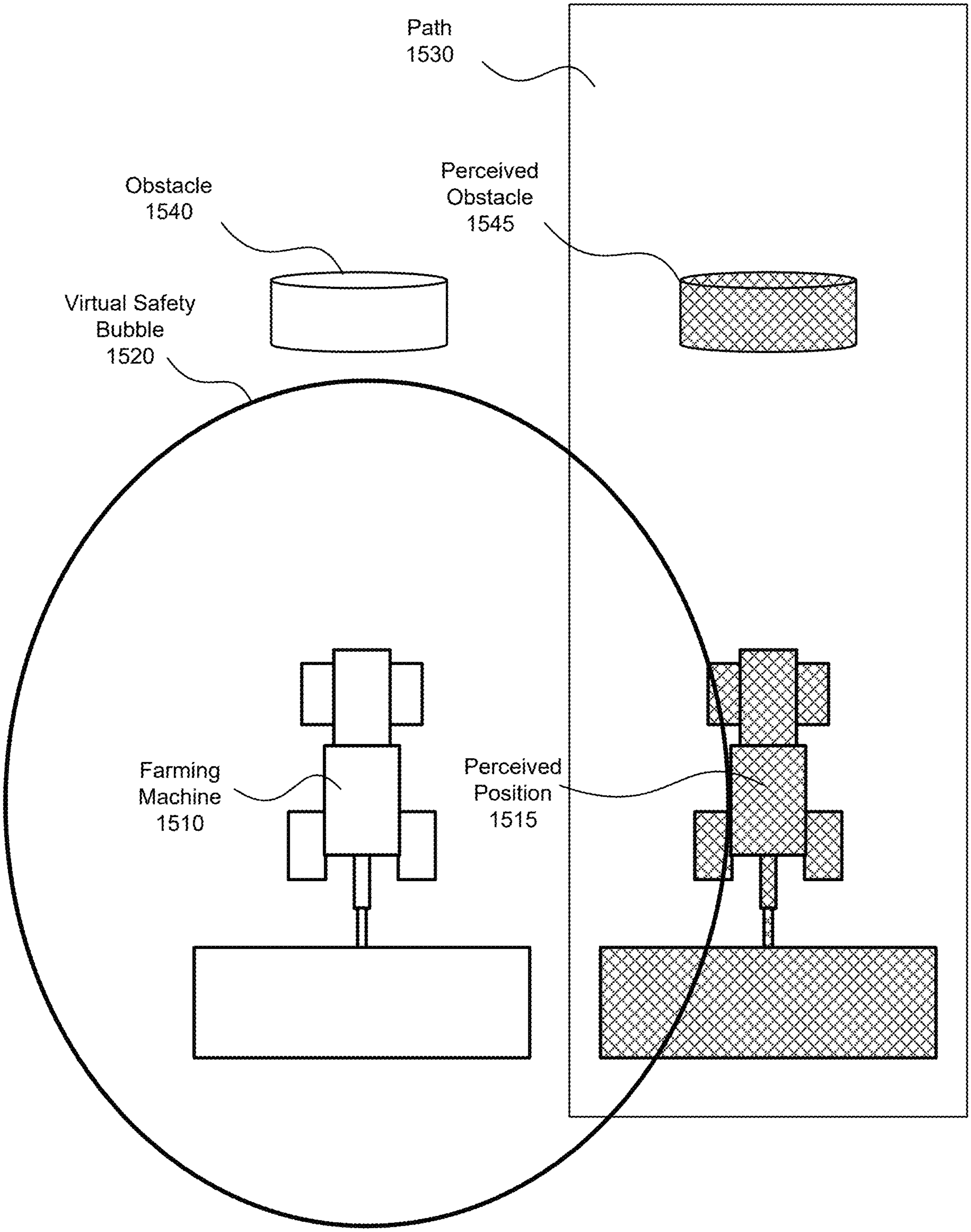
FIG. 15A illustrates navigation of a farming machine when off-path but perceived to be on-path, in accordance with one or more embodiments.

FIG. 15A illustrates navigation of a farming machine 1510 when off-path but perceived to be on-path, in accordance with one or more embodiments. The farming machine 1510 is an embodiment of the farming machine 100 comprising the control system 210. The farming machine 1510 may receive GPS coordinates such that a perceived position 1515 of the farming machine 1510 is on-path, i.e., on the path 1530. However, in fact, the farming machine 1510 is off-path. The farming machine 1510 utilizes the virtual safety bubble 1520, but will only enact preventive measures when the obstacle 1540 (which is off-path) enters the virtual safety bubble 1520. Obstacles that are on the actual path 1530 may not breach the virtual safety bubble 1520, such that the farming machine will continue operations. In some embodiments, the farming machine 1510 may received corrected GPS coordinates locating the farming machine 1510 off-path, although previously perceived to be on-path, at which point, the farming machine 1510 may generate and enact course-correction navigation to navigate the farming machine 1510 back onto the path 1530.

Figure 15B:
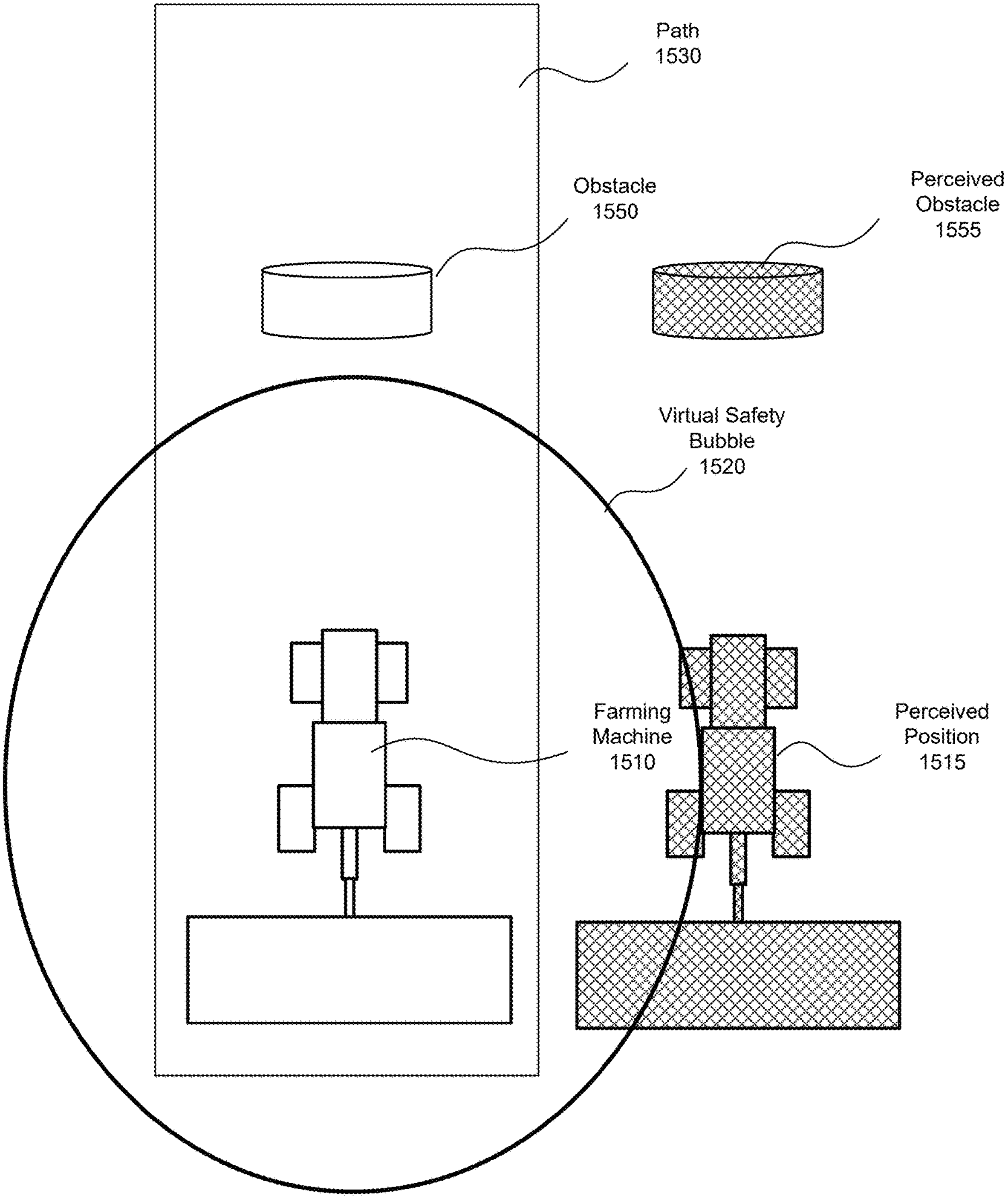
FIG. 15B illustrates navigation of a farming machine when on-path but perceived to be off-path, in accordance with one or more embodiments.

FIG. 15B illustrates navigation of a farming machine 1510 when on-path but perceived to be off-path, in accordance with one or more embodiments. This scenario is a converse to the scenario in FIG. 15A. If the farming machine 1510 encounters obstacle 1550 on the path 1530, though perceived to be off-path, e.g., perceived obstacle 1555 is not on the path 1530, the farming machine 1510 will enact preventive measures.

Figure 16:
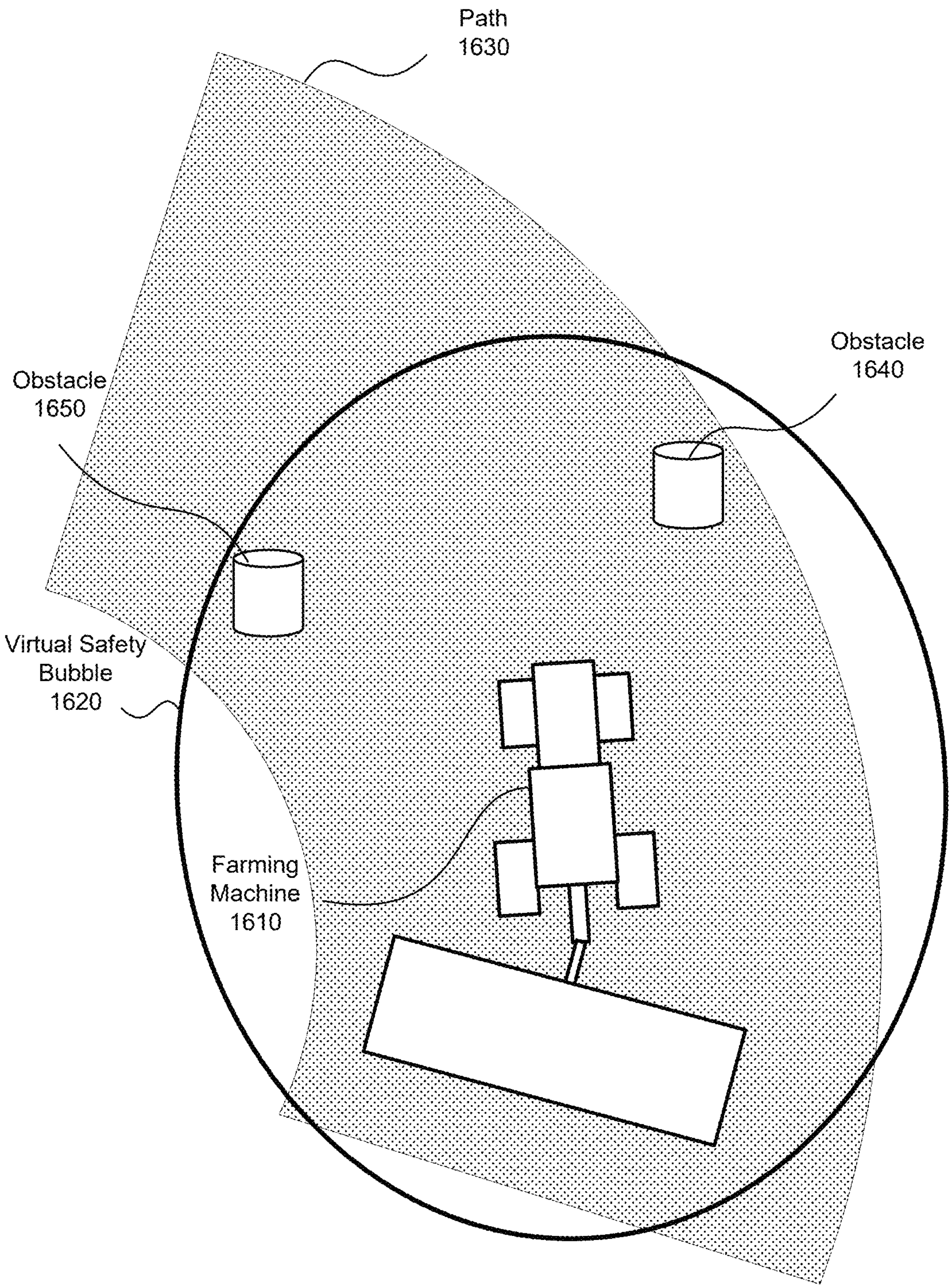
FIG. 16 illustrates navigation of a farming machine when on-turn on a curved path, in accordance with one or more embodiments.

FIG. 16 illustrates navigation of a farming machine 1610 when on-turn on a curved path 1630, in accordance with one or more embodiments. On-turn refers to the control system's perceived turning curvature matching to the target turning curvature to remain on the curved path 1630 when performing the turn. Off-turn refers to the control system's perceived turning curvature rotationally offset from the target turning curvature to remain on the curved path 1630. The farming machine 1610 is an embodiment of the farming machine 100 comprising the control system 210. When on a curved path 1630, the farming machine 1610 may adjust the virtual safety bubble 1620 to account for the turning radius of the farming machine 1610. For example, the virtual safety bubble 1620 may be extended in a turning direction of the farming machine 1610. When the farming machine 1610 detects one or more obstacles 1640 and 1650 are within the virtual safety bubble 1620, the farming machine 1610 can enact preventive measures.

Figure 17:
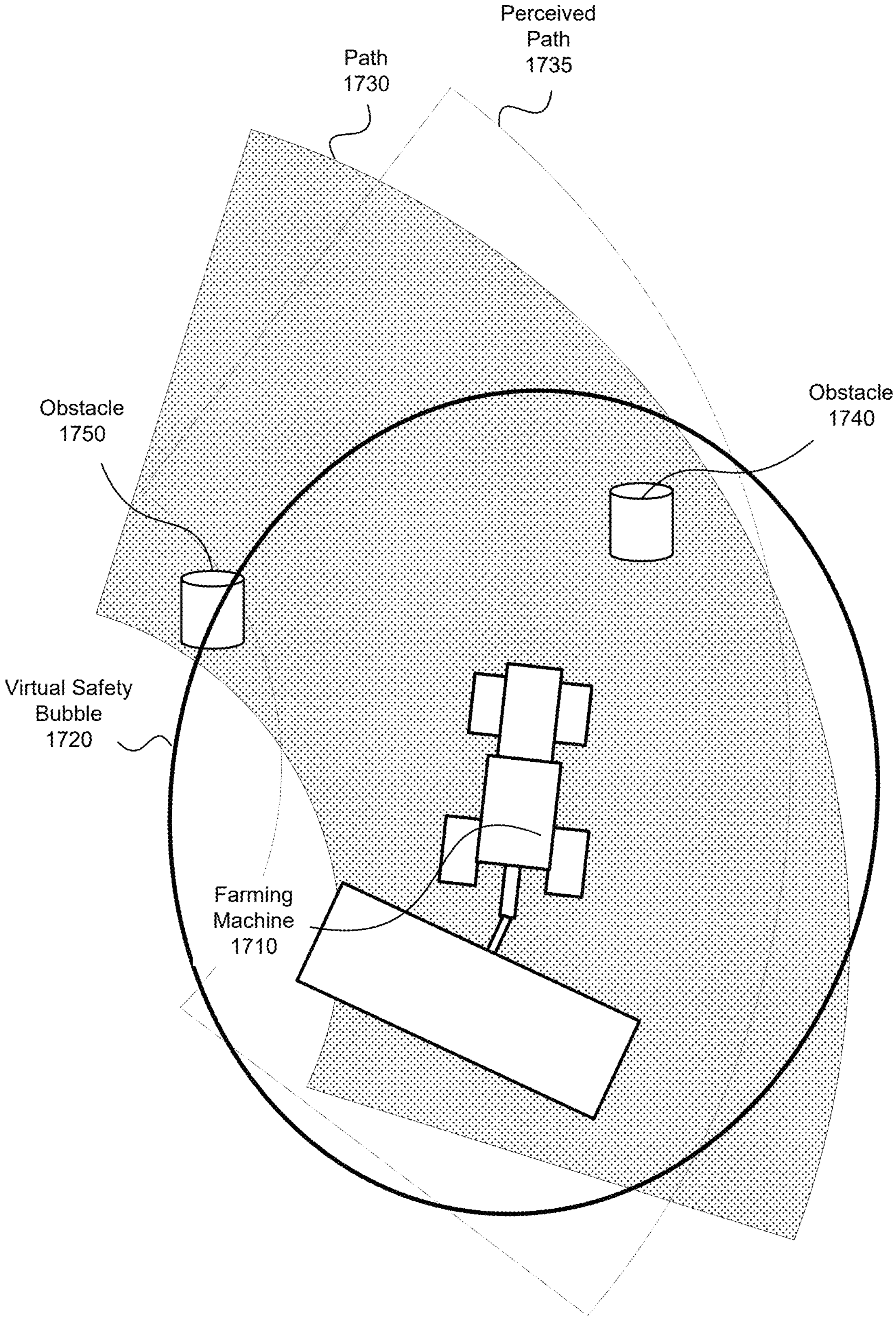
FIG. 17 illustrates navigation of a farming machine when off-turn on a curved path, in accordance with one or more embodiments.

FIG. 17 illustrates navigation of a farming machine when off-turn on a curved path 1730, in accordance with one or more embodiments. The farming machine 1710 is an embodiment of the farming machine 100 comprising the control system 210. The farming machine 1710 may have a perceived orientation that is skewed from the actual orientation. In such scenario, the farming machine 1710 is traveling along a perceived curved path 1735 that is offset from the curved path 1730. The farming machine 1710 may enact course-correction navigation to align the farming machine's 1710 orientation, i.e., to align the perceived path 1735 to the actual path 1730. In one or more embodiments, the farming machine 1710 can utilize the detection mechanisms to locate obstacles 1740 and 1750 on the path 1730 as markers on the path 1730.

XI. Example Computing System

Figure 18:
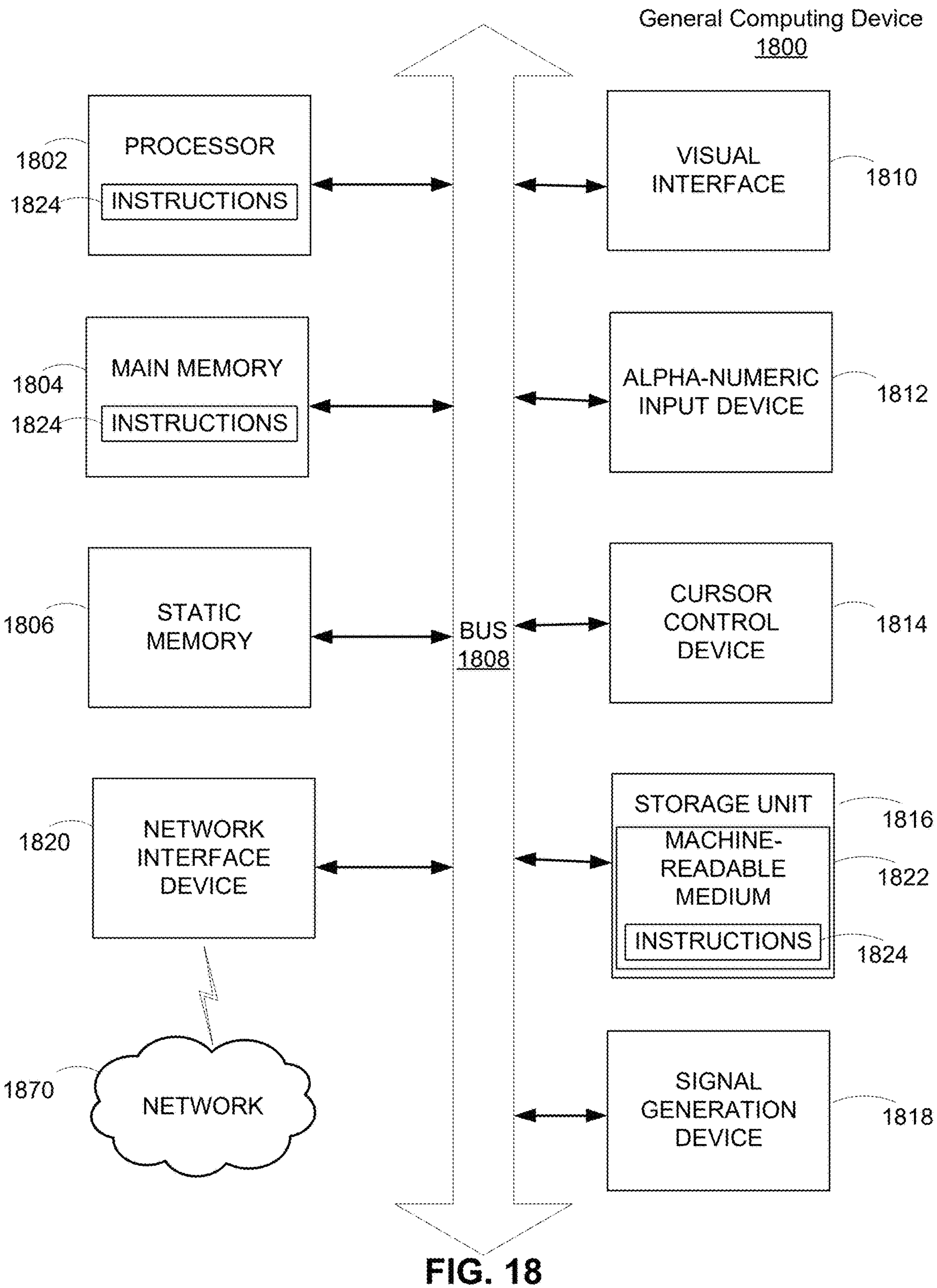
FIG. 18 illustrates an example computing system, in accordance with one or more embodiments.

FIG. 18 is a block diagram illustrating components of an example machine able to read instructions from a machine-readable medium and execute them in a processor (or controller). Specifically, FIG. 18 shows a diagrammatic representation of a machine in the example form a computer system 1800, within which program code (e.g., software or software modules) for causing the machine to perform any one or more of the methodologies discussed herein may be executed. The program code may be comprised of instructions 1824 executable by one or more processors 1802. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1824 (sequential or otherwise) that specify actions to be taken by that machine. Further, while only a single machine is illustrated, the term "machine" shall also be taken to include any collection of machines that individually or jointly execute instructions 1824 to perform any one or more of the methodologies discussed herein.

The example computer system 1800 includes a processor 1802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1804, and a static memory 1806, which are configured to communicate with each other via a bus 1808. The computer system 1800 may further include visual display interface 1810. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1810 may include or may interface with a touch enabled screen. The computer system 1800 may also include alphanumeric input device 1812 (e.g., a keyboard or touch screen keyboard), a cursor control device 1814 (e.g., a mouse, a trackball, a joystick, a motion sensor, or other pointing instrument), a storage unit 1816, a signal generation device 1818 (e.g., a speaker), and a network interface device 1820, which also are configured to communicate via the bus 1808.

The storage unit 1816 includes a machine-readable medium 1822 on which is stored instructions 1824 (e.g., software) embodying any one or more of the methodologies or functions described herein. The instructions 1824 (e.g., software) may also reside, completely or at least partially, within the main memory 1804 or within the processor 1802 (e.g., within a processor's cache memory) during execution thereof by the computer system 1800, the main memory 1804 and the processor 1802 also constituting machine-readable media. The instructions 1824 (e.g., software) may be transmitted or received over a network 190 via the network interface device 1820.

While machine-readable medium 1822 is shown in an example embodiment to be a single medium, the term "machine-readable medium" should be taken to include a single medium or multiple media (e.g., a centralized or distributed database, or associated caches and servers) able to store instructions (e.g., instructions 1824). The term "machine-readable medium" shall also be taken to include any medium that is capable of storing instructions (e.g., instructions 1824) for execution by the machine and that cause the machine to perform any one or more of the methodologies disclosed herein. The term "machine-readable medium" includes, but not be limited to, data repositories in the form of solid-state memories, optical media, and magnetic media.

XII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across one or more machines, e.g., computer system 700. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. It should be noted that where an operation is described as performed by "a processor," this should be construed to also include the process being performed by more than one processor. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing CMC change assessment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the disclosed principles.

What is claimed is:

1. A method for establishing a virtual safety bubble surrounding an autonomous farming machine comprising a detection system having a field of view of an environment surrounding the autonomous farming machine, the field of view comprising one or more blind spots of the environment, and the method comprising:

receiving a notification from an operator of the autonomous farming machine that there are no obstacles in the blind spots of the detection system, wherein receiving the notification from the operator that there are no obstacles in the blind spots comprises:

prompting the operator to walk around the autonomous farming machine in a resting position; and verifying the operator walks around the autonomous farming machine;

verifying that there are no obstacles in unobstructed views of the detection system by using the verification that the operator walked around the farming machine and by applying an obstacle detection model to images captured by the detection system;

determining a configuration of the autonomous farming machine to autonomously perform farming actions in the environment with implements of the autonomous farming machine;

determining a virtual safety bubble for the autonomous farming machine to autonomously perform the farming actions based on the determined configuration;

detecting an obstacle in the environment by applying the obstacle detection model to images captured by the detection system;

determining that the obstacle is within the virtual safety bubble; and in response to determining that the obstacle is within the virtual safety bubble, terminating operation of the autonomous farming machine.

2. The method of claim 1, wherein applying the obstacle detection model comprises:

segmenting pixels of the images as belonging to one of a plurality of object types including a first object type for obstacles.

3. The method of claim 2, wherein applying the obstacle detection model further comprises:

identifying a first obstacle from pixels classified as belonging to the first object type for obstacles.

4. The method of claim 1, further comprising:

switching the autonomous farming machine into a second configuration; and dynamically adjusting the virtual safety bubble based on the second configuration.

5. The method of claim 1, wherein the configuration is a combination of: machine path, velocity of the farming machine, acceleration of the farming machine, one or more characteristics of an expected obstacle, a type of implement employed by the farming machine, a type of mounting mechanism for mounting the implement to the autonomous farming machine, one or more farming actions undertaken by the autonomous farming machine, one or more characteristics of a farming action, one or more characteristics of the autonomous farming machine, one or more characteristics of the environment, a type of obstacle, and input from the operator.

6. The method of claim 1, wherein determining the virtual safety bubble comprises determining a shape and a size of the virtual safety bubble.

7. The method of claim 1, wherein determining that the obstacle is within the virtual safety bubble comprises:

determining a depth of the obstacle; and determining that the depth of the obstacle is less than a depth of the virtual safety bubble.

8. The method of claim 7, wherein determining the depth of the obstacle comprises applying a depth estimation model to one or more images of the obstacle captured by the detection system to predict the depth of the obstacle.

9. The method of claim 1, further comprising:

in response to determining that the obstacle is within the virtual safety bubble, enacting one or more preventive measures to avoid collision with the obstacle.

10. A non-transitory computer-readable storage medium storing instructions for establishing a virtual safety bubble surrounding an autonomous farming machine comprising a detection system having a field of view of an environment surrounding the farming machine, the field of view comprising one or more blind spots of the environment, and the instructions that, when executed by a computer processor, cause the computer processor to perform operations comprising:

receiving a notification from an operator of the autonomous farming machine that there are no obstacles in the blind spots of the detection system, wherein receiving the notification from the operator that there are no obstacles in the blind spots comprises:

prompting the operator to walk around the autonomous farming machine in a resting position; and verifying the operator walks around the autonomous farming machine;

verifying that there are no obstacles in unobstructed views of the detection system by using the verification that the operator walked around the farming machine and by applying an obstacle detection model to images captured by the detection system;

determining a configuration of the autonomous farming machine to autonomously perform farming actions in the environment with implements of the farming machine;

determining a virtual safety bubble for the autonomous farming machine to autonomously perform the farming actions based on the determined configuration;

detecting an obstacle in the environment by applying the obstacle detection model to images captured by the detection system;

determining that the obstacle is within the virtual safety bubble; and in response to determining that the obstacle is within the virtual safety bubble, terminating operation of the autonomous farming machine.

11. The non-transitory computer-readable storage medium of claim 10, wherein applying the obstacle detection model comprises:

segmenting pixels of the images as belonging to one of a plurality of object types including a first object type for obstacles.

12. The non-transitory computer-readable storage medium of claim 11, wherein applying the obstacle detection model further comprises:

identifying a first obstacle from pixels classified as belonging to the first object type for obstacles.

13. The non-transitory computer-readable storage medium of claim 10, the operations further comprising:

switching the autonomous farming machine into a second configuration; and dynamically adjusting the virtual safety bubble based on the second configuration.

14. The non-transitory computer-readable storage medium of claim 10, wherein the configuration is a combination of: machine path, velocity of the farming machine, acceleration of the farming machine, one or more characteristics of an expected obstacle, a type of implement employed by the autonomous farming machine, a type of mounting mechanism for mounting the implement to the farming machine, one or more farming actions undertaken by the autonomous farming machine, one or more characteristics of a farming action, one or more characteristics of the autonomous farming machine, one or more characteristics of the environment, a type of obstacle, and input from the operator.

15. The non-transitory computer-readable storage medium of claim 10, wherein determining the virtual safety bubble comprises determining a shape and a size of the virtual safety bubble.

16. The non-transitory computer-readable storage medium of claim 10, wherein determining that the obstacle is within the virtual safety bubble comprises:

determining a depth of the obstacle; and determining that the depth of the obstacle is less than a depth of the virtual safety bubble.

17. The non-transitory computer-readable storage medium of claim 16, wherein determining the depth of the obstacle comprises applying a depth estimation model to one or more images of the obstacle captured by the detection system to predict the depth of the obstacle.

18. The non-transitory computer-readable storage medium of claim 10, the operations further comprising:

in response to determining that the obstacle is within the virtual safety bubble, enacting one or more preventive measures to avoid collision with the obstacle.

19. An autonomous farming machine navigable in an operating environment for performing one or more farming actions, the farming machine comprising:

a detection system comprising one or more cameras configured to capture images of the operating environment surrounding the farming machine, the detection system having a field of view comprising one or more blind spots of the environment;

a treatment mechanism configured to apply treatment to a treatment area as part of the one or more farming actions;

a control system for establishing a virtual safety bubble surrounding the autonomous farming machine comprising:

a computer processor, and a non-transitory computer-readable storage medium storing instructions that, when executed by the computer processor, cause the computer processor to perform operations comprising:

receiving a notification from an operator of the autonomous farming machine that there are no obstacles in the blind spots of the detection system wherein receiving the notification from the operator that there are no obstacles in the blind spots comprises:

prompting the operator to walk around the autonomous farming machine in a resting position; and capturing images of the operator walking around the autonomous farming machine, wherein detecting a completed walk-around indicates no obstacles in the blind spots of the detection system; and verifying that there are no obstacles in unobstructed views of the detection system by using the verification that the operator walked around the farming machine and by applying an obstacle detection model to images captured by the detection system;

determining a configuration of the autonomous farming machine to autonomously perform farming actions in the environment with implements of the farming machine;

determining a virtual safety bubble for the autonomous farming machine to autonomously perform the farming actions based on the determined configuration;

detecting an obstacle in the environment by applying the obstacle detection model to images captured by the detection system;

determining that the obstacle is within the virtual safety bubble; and in response to determining that the obstacle is within the virtual safety bubble, terminating operation of the autonomous farming machine.

* * * * *